(12) United States Patent
Chen et al.

(10) Patent No.: US 11,988,396 B2
(45) Date of Patent: May 21, 2024

(54) MULTI-GAS-SOURCE HEATER

(71) Applicant: Chant Heat Energy Science & Technology (Zhongshan) Co., LTD., Zhongshan (CN)

(72) Inventors: Neng Chen, Zhongshan (CN); Youwen Wu, Zhongshan (CN); Chao Zhang, Zhongshan (CN); Jiaming Zhong, Zhongshan (CN); Liuming Tan, Zhongshan (CN); Zhenghui Mai, Zhongshan (CN)

(73) Assignee: Chant Heat Energy Science & Technology (Zhongshan) Co., LTD. (CN)

( * ) Notice: Subject to any disclaimer, the term of this patent is extended or adjusted under 35 U.S.C. 154(b) by 0 days.

(21) Appl. No.: 17/257,946

(22) PCT Filed: Nov. 27, 2020

(86) PCT No.: PCT/CN2020/132283
§ 371 (c)(1),
(2) Date: Jan. 5, 2021

(87) PCT Pub. No.: WO2022/062168
PCT Pub. Date: Mar. 31, 2022

(65) Prior Publication Data
US 2024/0011647 A1    Jan. 11, 2024

(30) Foreign Application Priority Data

Sep. 24, 2020  (CN) .......................... 202011018582.8

(51) Int. Cl.
*F24D 15/02*    (2006.01)
*F16K 11/083*   (2006.01)
(Continued)

(52) U.S. Cl.
CPC ............ *F24D 15/02* (2013.01); *F16K 11/083* (2013.01); *F16K 17/168* (2013.01); *F23D 14/02* (2013.01); *F23D 14/48* (2013.01); *F23D 14/64* (2013.01)

(58) Field of Classification Search
CPC ...... F16K 11/083; F16K 17/168; F23D 14/02; F23D 14/48; F23D 14/64; F23N 2237/08
(Continued)

(56) References Cited

U.S. PATENT DOCUMENTS

2010/0170503 A1* 7/2010 Deng ...................... F23Q 9/045
126/85 R

* cited by examiner

*Primary Examiner* — Vivek K Shirsat

(57) ABSTRACT

A multi-gas-source heater is disclosed including a main shell, an ignition apparatus, a pipeline system arranged on the main shell, a temperature-sensing valve, a burner and a switching valve; the pipeline system has a first and second communication states; the temperature-sensing valve is connected to the pipeline system and can regulate flow of output gas; the burner includes a first and second nozzles both connected to the pipeline system; the ignition apparatus is connected to and can ignite the burner; the switching valve is connected to and can switch the pipeline system between the first and second communication states; when the switching valve switches the pipeline system to the first communication state, the first nozzle outputs the gas; when the switching valve switches the pipeline system to the second communication state, the second nozzle outputs the gas, or the first and second nozzles both output the gas.

7 Claims, 12 Drawing Sheets

(51) Int. Cl.
  *F16K 17/168* (2006.01)
  *F23D 14/02* (2006.01)
  *F23D 14/48* (2006.01)
  *F23D 14/64* (2006.01)
(58) Field of Classification Search
  USPC .................................................... 126/116 R
  See application file for complete search history.

MULTI-GAS-SOURCE HEATER

PRIORITY

This application is a national stage filing, under 35 U.S.C. § 371, of International Application Number PCT/CN2020/132283, filed Nov. 27, 2020, claiming priority thereto, which claims priority to Chinese Patent Application Number 202011018582.8, filed Sep. 24, 2020. This application claims priority under 35 U.S.C. § 119 to Chinese Patent Application Number 202011018582.8, filed Sep. 24, 2020. The entire content of International Application Number PCT/CN2020/132283, filed Nov. 27, 2020, is incorporated by reference. The entire content of Chinese Patent Application Number 202011018582.8, filed Sep. 24, 2020, is incorporated by reference.

FIELD

The present disclosure relates to the field of gas devices, and more particularly, to a multi-gas-source heater.

BACKGROUND

With continuous development of society, more types of gases are available for people to choose, such as high calorific value gases including liquefied petroleum gas, propane, and the like, and low calorific value gases including natural gas, artificial gas, and the like. The liquefied petroleum gas and the natural gas are gases commonly used at present. Since these two gases have a different calorific value and pressure, they apply to gas devices with different arrangement of pipelines and nozzle. An existing gas heater can only be applied to one type of gas. When a user changes the type of gas used, it is generally necessary to contact a manufacturer to replace related internal components in a gas fireplace, so that the gas heater is applicable to the type of gas replaced, which is not only inconvenient for the user to use, but also increases use costs.

SUMMARY

The present disclosure aims to solve at least one of the technical problems in the existing technology. For this purpose, the present disclosure provides a multi-gas-source heater, which has a simple and reasonable structure, and is well applicable to switching use of gas source environments of high calorific value gas and low calorific value gas, thus being convenient to use.

A multi-gas-source heater according to the embodiment of the present disclosure includes a main shell, an ignition apparatus, a pipeline system arranged on the main shell, a temperature-sensing valve, a burner and a switching valve; the pipeline system has a first communication state applied to high calorific value gas and a second communication state applied to low calorific value gas; the temperature-sensing valve is connected to the pipeline system, and the temperature-sensing valve is capable of regulating flow of an output gas; the burner includes a first nozzle and a second nozzle, the first nozzle and the second nozzle are both connected to the pipeline system, the first nozzle is applicable to the high calorific value gas, and the second nozzle is applicable to the low calorific value gas; the ignition apparatus is connected to the burner and is capable of igniting the burner; the switching valve is connected to the pipeline system, and the switching valve is capable of switching the pipeline system between the first communication state and the second communication state; when the switching valve switches the pipeline system to the first communication state, the first nozzle outputs the gas; and when the switching valve switches the pipeline system to the second communication state, the second nozzle outputs the gas, or the first nozzle and the second nozzle both output the gas.

The multi-gas-source heater according to the embodiment of the present disclosure has at least the following beneficial effects. When in use, the gas is input into the temperature-sensing valve, the temperature-sensing valve regulates the flow of the output gas and outputs the gas to the pipeline system, the switching valve controls the switching of the communication states in the pipeline system. When the gas to be used is the high calorific value gas, a user may switch the pipeline system to the first communication state through the switching valve, at the moment, the gas is output to the burner through the first nozzle, and ignited by the ignition apparatus, and the gas in the burner is combusted to supply heat. When the gas to be used is the low calorific value gas, the user may switch the pipeline system to the second communication state through the switching valve, at the moment, the gas is output to the burner through the second nozzle or the gas is output to the burner through both of the first nozzle and the second nozzle, and ignited by the ignition apparatus, and the gas in the burner is combusted to supply heat. The present disclosure has a simple structure, the pipeline system is switched by the switching valve between the communication states, so that the gas can be output through different nozzles. Therefore the present disclosure is applicable in switching between the gas source environment with a high calorific value gas and the gas source environment with a low calorific value gas, and convenient for the user to switch gas sources to be used.

According to some embodiments of the present disclosure, the main shell is provided with a pressure stabilizing valve connected to the pipeline system, the pressure stabilizing valve is capable of outputting the gas at a stable pressure, and the pressure stabilizing valve has a first pressure stabilizing state applied to the high calorific value gas and a second pressure stabilizing state applied to the low calorific value gas. By arranging the pressure stabilizing valve applicable to different gas source environments, gas pressure in the pipeline system can be stabilized, so as to avoid an excessively large gas pressure which may easily damage the pipeline system and other internal valve bodies, thus improving a reliability. Meanwhile, the pressure stabilizing valve may also be switched between different use states according to a type of a gas source to be used, which is well applicable to the switching use of the gas source environments with the high calorific value gas and the low calorific value gas.

According to some embodiments of the present disclosure, the pressure stabilizing valve includes a first shell, a second shell, a diaphragm, a pressure stabilizing rod, an elastic assembly and a regulating assembly, the first shell is provided with a gas inlet channel and a gas outlet channel, the diaphragm is connected between the first shell and the second shell, the diaphragm is hermetically connected to the first shell to form a first cavity, the diaphragm is hermetically connected to the second shell to form a second cavity, the gas inlet channel and the gas outlet channel are both communicated with the first cavity, the regulating assembly is connected to the second shell, the elastic assembly is connected to the regulating assembly and acts on the diaphragm, the pressure stabilizing rod is connected to the diaphragm, the diaphragm is deformable and extendable to drive the pressure stabilizing rod to move relative to the first shell, the pressure stabilizing rod is configured, cooperatively with a gas outlet of the gas inlet channel, to regulate a ventilation capacity, and the regulating assembly is capable of regulating an elastic force of the elastic assembly acted on the diaphragm, so as to switch the pressure stabilizing valve between the first pressure stabilizing state and the second pressure stabilizing state. When in use, the pressure stabilizing valve drives the pressure stabilizing rod to move through deformation and extension of the diaphragm, and the pressure stabilizing rod is configured, cooperatively with the gas outlet of the gas inlet channel, to regulate the ventilation capacity, thus achieving the purpose of pressure stabilization. When switching the gas, the elastic force acted on the diaphragm is regulated through the regulating assembly, so as to regulate and change an ability of deformation and extension of the diaphragm, so that the pressure stabilizing valve is applicable to two types of gases (i.e., the high calorific value gas and the low calorific value gas) with different pressures, realizing the switching of the pressure stabilizing valve between the first pressure stabilizing state and the second pressure stabilizing state. Therefore, the present disclosure has a simple structure and is convenient to use.

According to some embodiments of the present disclosure, the switching valve includes a linkage member, the linkage member is connected to the regulating assembly, and when the switching valve switches the pipeline system between the first communication state and the second communication state, the switching valve is capable of being linked with the regulating assembly through the linkage member. When the gas source used is to be switched, a communication condition of the pipeline system is regulated and changed through the switching valve according to the type of the gas source to be switched, so that the pipeline system is in a communication state applied to the gas source. Moreover, the switching valve is capable of being linked with the regulating assembly through the linkage member when performing switching and regulation, so that the pressure stabilizing valve can be switched between the first pressure stabilizing state and the second pressure stabilizing state, which is convenient for using and operating when switching the gas, thus having a simple and reasonable structure, avoiding switching and regulating the switching valve and the pressure stabilizing valve for multiple times, and being convenient to use.

According to some embodiments of the present disclosure, the regulating assembly includes a first connecting member, a second connecting member, a moving member and a first elastic member, the first connecting member and the second connecting member are both connected to the second shell, the moving member is slidably connected to the first connecting member, two ends of the first elastic member are respectively connected to the first connecting member and the moving member, and the moving member is capable of abutting against the linkage member under an action of the first elastic member; the elastic assembly includes a second elastic member and a third elastic member, one end of the second elastic member is connected to the moving member, and the third elastic member is connected to the second connecting member and acts on the diaphragm; and the switching valve includes a third shell and a plug valve rod, the plug valve rod is movably inserted into the third shell, the linkage member is connected to the plug valve rod, the plug valve rod is movable relative to the third shell and is capable of driving the linkage member to move relative to the third shell, and the linkage member is capable of pushing the moving member to move relative to the second shell, so that the other end of the second elastic member acts on the diaphragm. When the pressure stabilizing valve needs to be switched to the second pressure stabilizing state, the linkage member is driven to move through the plug valve rod, and the linkage member pushes the moving member to move, so that the second elastic member acts on the diaphragm, at the moment, the second elastic member and the third elastic member act on the diaphragm, the diaphragm is difficult to be deformed and extended under an effect of the gas pressure, and the pressure stabilizing valve is applicable to the high calorific value gas. When the pressure stabilizing valve needs to be switched to the first pressure stabilizing state, the linkage member is reset and moved through the plug valve rod, under an action of the first elastic member, the moving member abuts against a linkage rod, moves along with the linkage rod and resets, and drives the second elastic member to move to reset, so as to be separated from the diaphragm, at the moment, the third elastic member acts on the diaphragm, the diaphragm is easy to be deformed and extended under an effect of the gas pressure, and the pressure stabilizing valve is applicable to the low calorific value gas. Therefore, the present disclosure has a simple and reasonable structure, is convenient to switch the pressure stabilizing valve between the first pressure stabilizing state and the second pressure stabilizing state, is convenient to link the switching valve with the pressure stabilizing valve by the linkage member, and is convenient to use.

According to some embodiments of the present disclosure, the switching valve further includes a plug valve core, the third shell is provided with a valve core channel and a plurality of connecting channels communicated with the valve core channel, the connecting channels are connected to the pipeline system, the plug valve core is rotatably arranged in the valve core channel, one end of the plug valve rod extends into the valve core channel and is provided with a clamping part protruding along a radial direction, the plug valve core is correspondingly provided with a clamping slot for clamping the clamping part, the plug valve rod is capable of driving the plug valve core to rotate through cooperation of the clamping part and the clamping slot, and the plug valve core enables communication or separation of the valve core channel and the connecting channel. By cooperation of the clamping part with the clamping slot, i.e., the clamping part is clamped into the clamping slot on the plug valve core, the plug valve rod can drive the plug valve core to rotate so that the plug valve core can communicate the connecting channel with the valve core channel or separate the connecting channel from the valve core channel, to enable the switching valve to regulate a communication condition among the plurality of connecting channels so as to regulate and change the communication state of the pipeline system. Therefore, the present disclosure has a simple structure, is convenient to manufacture and process, and is stable and reliable in transmission connection.

According to some embodiments of the present disclosure, the switching valve further includes a fourth elastic member, a first clamping slot for limiting and a second clamping slot for limiting are arranged in the valve core channel, the first clamping slot for limiting is provided with a first slot bottom, the second clamping slot for limiting is provided with a second slot bottom, a spacing distance is arranged between the first slot bottom and the second slot bottom along an axial direction of the valve core channel, the fourth elastic member is connected between the plug valve rod and the plug valve core, the clamping part is capable of being clamped into the first clamping slot for limiting and abutting against the first slot bottom under an action of the fourth elastic member, and the clamping part is capable of being clamped into the second clamping slot for limiting under the action of the fourth elastic member and abutting against the second slot bottom. By arranging the first clamping slot for limiting and the second clamping slot for limiting, and arranging the spacing distance between the first slot bottom and the second slot bottom along the axial direction of the valve core channel, when the pressure stabilizing valve is switched to different pressure stabilizing states, the clamping part of the plug valve rod is correspondingly clamped into different clamping slots for limiting, and abuts against a corresponding slot bottom position, so that the plug valve rod is capable of driving the linkage member to keep pushing on the regulating assembly or release pushing on the regulating assembly. Therefore, the present disclosure has a simple and reasonable structure, and keeps the pressure stabilizing valve in the first pressure stabilizing state or the second pressure stabilizing state, and a reliability of the present disclosure is improved.

According to some embodiments of the present disclosure, the burner includes a combustion shell and an injection pipe connected to the combustion shell, the combustion shell is internally provided with a gas chamber, a combustion structure for outputting gas in the gas chamber is arranged on the combustion shell, the injection pipe includes a mixing channel, a first channel and a second channel, an outlet end of the first channel and an outlet end of the second channel are communicated with each other and are both communicated with the mixing channel, an acute included angle is formed between the first channel and the second channel, the first nozzle is correspondingly connected to an inlet of the first channel, an axis of the first nozzle is collinear with an axis of the first channel, the second nozzle is correspondingly connected to an inlet of the second channel, an axis of the second nozzle is collinear with an axis of the second channel, the mixing channel is communicated with the gas chamber, and the ignition apparatus is capable of igniting the output gas of the combustion structure. When in use, the first nozzle and the second nozzle are both connected to the pipeline system, the communication condition of the pipeline system is switched through the switching valve, when one of the first nozzle and the second nozzle outputs the gas, the gas injects surrounding air into a channel corresponding to the injection pipe, the gas and the air are mixed and output to the gas chamber through the mixing channel, and then output through the gas structure and ignited by the ignition apparatus, so as to be combusted to supply heat. When the first nozzle and the second nozzle both output the gas, the two nozzles eject gas into corresponding channels respectively, arrangement of the two channels can reduce mutual interference between gas flows at an initial injection stage and add an air supply amount once. When the gas is ejected from a nozzle port at a high speed, the surrounding air is injected into the gas inlet channel, and the gas and the air begin to be mixed. When the gas enters the mixing channel from the first channel and the second channel, since the acute included angle exists between the two channels, two gas flows are ejected along an included angle direction and begin to approach a middle, and finally the gas and the air are mixed again in the mixing channel, so that the gas and the air are well mixed, which is beneficial for improving a combustion performance of the burner, implementing full combustion of the gas well, and improving a thermal efficiency. Therefore, the present disclosure has a simple and reasonable structure, is applied to different injection situations, and has a good applicability.

According to some embodiments of the present disclosure, an outlet end of the mixing channel is connected with a splitter plate, the splitter plate is provided with a plurality of splitter holes, and the splitter plate is connected with a buffer baffle. By arranging the splitter plate and arranging the plurality of splitter holes in the splitter plate, the gas can be uniformly dispersed and output to the gas chamber from the splitter holes, so as to avoid excessively concentrated output of the gas, thus improving a combustion effect of the present disclosure. Meanwhile, the buffer baffle plate is capable of blocking the gas to slow down a flow rate of the gas, and is capable of avoiding excessively high combustion flame of the burner caused by excessively rapid ejection of the gas flow, thus improving a use safety of the present disclosure.

According to some embodiments of the present disclosure, the ignition apparatus includes a first ever-burning assembly, a second ever-burning assembly, an ignition control assembly and a feedback control module, the first ever-burning assembly includes a first ignition needle, a first thermocouple and a third nozzle, the second ever-burning assembly includes a second ignition needle, a second thermocouple and a fourth nozzle, the third nozzle and the fourth nozzle are both connected to the pipeline system, the third nozzle is applicable to high calorific value gas, the fourth nozzle is applicable to low calorific value gas, the first ignition needle and the second ignition needle are both electrically connected to the ignition control assembly, the ignition control assembly enables the first ignition needle and the second ignition needle to generate an electric spark, the feedback control module is electrically connected to the temperature-sensing valve, the first thermocouple and the second thermocouple respectively, the first thermocouple and the second thermocouple are both capable of feeding back a potential to the feedback control module according to heating conditions, and the feedback control module is capable of controlling the temperature-sensing valve to be turned on and off according to feedback conditions of the first thermocouple and the second thermocouple. When in use, the third nozzle and the fourth nozzle output the gas according to the communication state of the pipeline system, the ignition control assembly makes the first ignition needle and the second ignition needle generate the electric spark, so as to ignite the gas output by the third nozzle and the fourth nozzle, the combustion of the gas makes the first thermocouple and the second thermocouple induce the feedback electric potential to the feedback control module, the feedback control module controls the temperature-sensing valve to be turned on and off according to the feedback electric potential situation, thus implementing ignition operation of the ignition apparatus, and an ignition condition can be fed back to the feedback control module through the thermocouple, so that the temperature-sensing valve can be controlled to be turned on and off through the feedback control module, thus improving a use safety of the present disclosure.

BRIEF DESCRIPTION OF THE DRAWINGS

The above and/or additional aspects and advantages of the present disclosure will be apparent and easily understood from the description of the embodiments with reference to the following accompanying drawings, wherein.

REFERENCE NUMERALS

Figure 1:
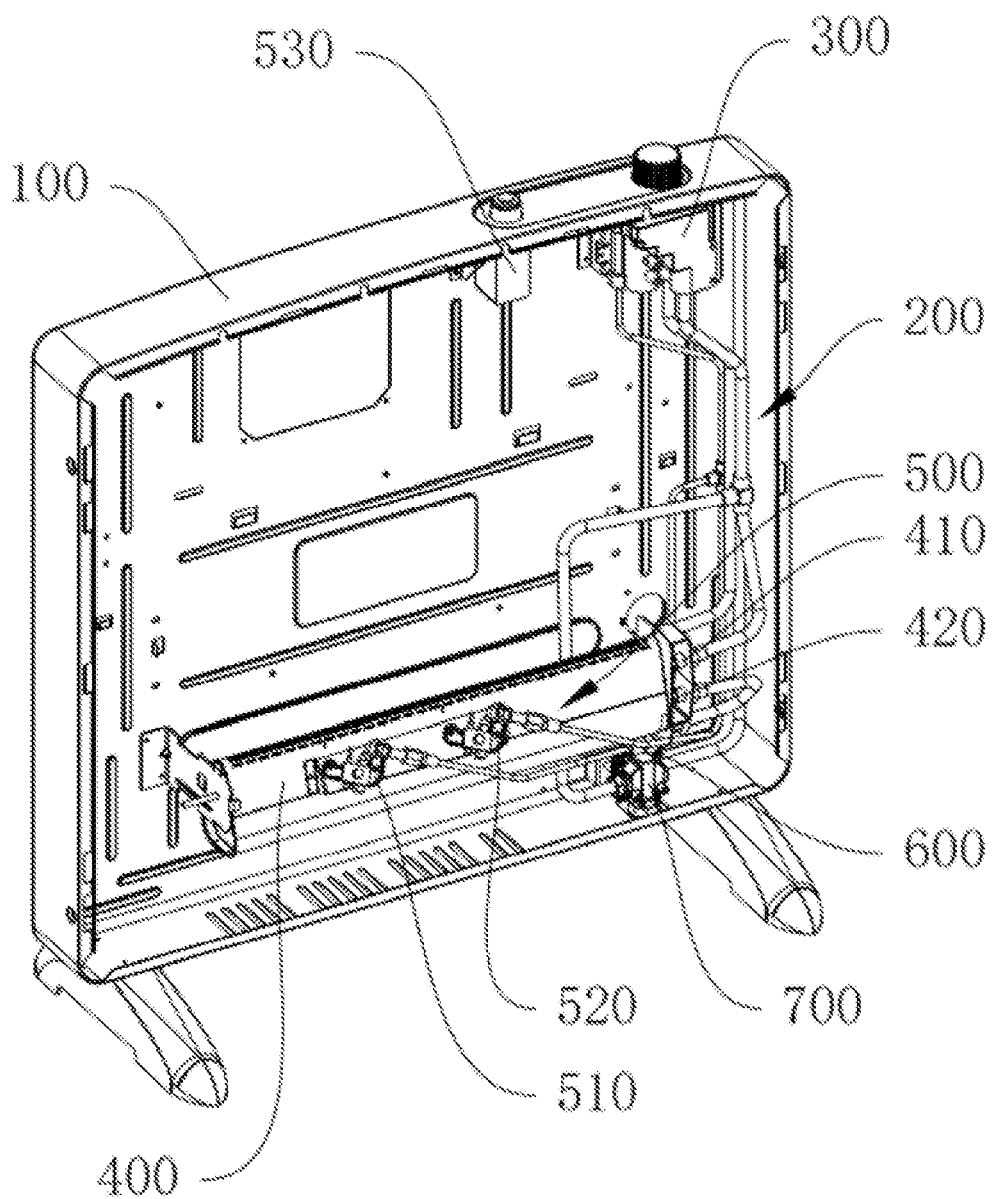
FIG. 1 is a structure diagram of a multi-gas-source heater according to an embodiment of the present disclosure.

100 refers to main shell;

200 refers to pipeline system, 210 refers to first pipeline, 220 refers to second pipeline, 230 refers to third pipeline, 240 refers to fourth pipeline, 250 refers to fifth pipeline, 260 refers to sixth pipeline, and 270 refers to seventh pipeline;

300 refers to temperature-sensing valve; 400 refers to burner, 410 refers to first nozzle, 420 refers to second nozzle, 430 refers to combustion shell, 431 refers to gas chamber, 432 refers to combustion structure, 440 refers to injection pipe, 441 refers to first channel, 442 refers to second channel, 443 refers to mixing channel, 450 refers to splitter plate, 451 refers to splitter hole, and 452 refers to buffer baffle;

500 refers to ignition apparatus, 510 refers to first ever-burning assembly, 511 refers to first ignition needle, 512 refers to first thermocouple, 513 refers to third nozzle, 520 refers to second ever-burning assembly, 521 refers to second ignition needle, 522 refers to second thermocouple, 523 refers to fourth nozzle, and 530 refers to ignition control assembly;

600 refers to switching valve, 610 refers to linkage member, 620 refers to third shell, 621 refers to valve core channel, 622 refers to connecting channel, 623 refers to first clamping slot for limiting, 624 refers to second clamping slot for limiting, 625 refers to first slot bottom, 626 refers to second slot bottom, 630 refers to plug valve rod, 631 refers to clamping part, 632 refers to clamping sheet, 633 refers to fifth elastic member, 640 refers to plug valve core, 641 refers to clamping slot, and 650 refers to fourth elastic member; and

700 refers to pressure stabilizing valve, 710 refers to first shell, 711 refers to gas inlet channel, 712 refers to gas outlet channel, 713 refers to first cavity, 714 refers to second shell, 721 refers to second cavity, 730 refers to diaphragm, 740 refers to pressure stabilizing rod, 750 refers to elastic assembly, 751 refers to second elastic member, 752 refers to third elastic member, 760 refers to regulating assembly, 761 refers to first connecting member, 762 refers to second connecting member, 763 refers to moving member, and 764 refers to first elastic member.

DETAILED DESCRIPTION OF THE EMBODIMENTS

Reference will now be made in detail to the embodiments of the present disclosure, examples of which are illustrated in the accompanying drawings, wherein like reference numerals refer to the same or similar elements or elements having the same or similar functions throughout. The embodiments described below with reference to the accompanying drawings are illustrative only for the purpose of explaining the disclosure and are not to be construed as limiting the disclosure.

In the description of the disclosure, it should be understood that the positional descriptions referred to, for example, the directional or positional relationships indicated by up, down, front, rear, left, right, etc., are based on the directional or positional relationships shown in the drawings, and are only for convenience and simplification of description of the disclosure, but not for indicating or implying that the referred device or element must have a specific direction, be constructed and operated in a specific direction, and thus should not be construed as limiting the disclosure.

In the description of the disclosure, "several" means one or more, "a plurality of" means two or more, and "greater than", "less than", "more than", etc. are understood as excluding the number itself, "above", "below", "within", etc. are understood as including the number itself.

The terms "first", "second", etc., if referred to, are for the purpose of distinguishing technical features only, cannot be understood as indicating or implying a relative importance or implicitly indicating the number of technical features indicated or implicitly indicating the precedence of technical features indicated.

In the description of the disclosure, unless otherwise clearly defined, terms such as "arrange", "mount", "connect" should be understood in a broad sense, and those skilled in the art can reasonably determine the specific meanings of the above terms in the disclosure by combining the specific contents of the technical solutions With reference to FIG. 1, a multi-gas-source heater includes a main shell 100, an ignition apparatus 500, a pipeline system 200 arranged on the main shell 100, a temperature-sensing valve 300, a burner 400 and a switching valve 600. The pipeline system 200 has a first communication state applied to high calorific value gas and a second communication state applied to low calorific value gas. The temperature-sensing valve 300 is connected to the pipeline system 200, and the temperature-sensing valve 300 is capable of regulating flow of an output gas. The burner 400 includes a first nozzle 410 and a second nozzle 420, the first nozzle 410 and the second nozzle 420 are both connected to the pipeline system 200, the first nozzle 410 is applicable to the high calorific value gas, and the second nozzle 420 is applicable to the low calorific value gas. The ignition apparatus 500 is connected to the burner 400 and is capable of igniting the burner 400. The switching valve 600 is connected to the pipeline system 200, and the switching valve 600 is capable of switching the pipeline system 200 between the first communication state and the second communication state. When the switching valve 600 switches the pipeline system 200 to the first communication state, the first nozzle 410 outputs the gas. When the switching valve 600 switches the pipeline system 200 to the second communication state, the second nozzle 420 outputs the gas, or the first nozzle 410 and the second nozzle 420 both output the gas.

When in use, the gas is input into the temperature-sensing valve 300, the temperature-sensing valve 300 regulates the flow of the output gas and outputs the gas to the pipeline system 200, and the switching valve 600 controls switching of the communication states of the pipeline system 200. When the gas to be used is the high calorific value gas, a user may switch the pipeline system 200 to the first communication state through the switching valve 600 in which the gas is output to the burner 400 through the first nozzle 410, and ignited by the ignition apparatus 500, and the gas in the burner 400 is combusted to supply heat. When the gas to be used is the low calorific value gas, the user may switch the pipeline system 200 to the second communication state through the switching valve 600 in which the gas is output to the burner 400 through the second nozzle 420 or the gas is output to the burner 400 through both of the first nozzle 410 and the second nozzle 420, and ignited by the ignition apparatus, and the gas in the burner 400 is combusted to supply heat. The present disclosure has a simple structure, the pipeline system 200 is switched by the switching valve 600 between the communication states, so that the gas can be output through different nozzles. Therefore the present disclosure is applicable in switching between the gas source environment with a high calorific value gas and the gas source environment with a low calorific value gas, and convenient for the user to switch gas sources to be used.

In actual application, specific structural forms of the pipeline system 200, the burner 400 and the switching valve 600 may be set according to actual use needs, which will not be described in detail here, but will be described in detail below. Since configuration and principle of the temperature-sensing valve 300 according to the embodiment of the present disclosure are known to those of ordinary skills in the art, they will not be described in detail here.

In some embodiments, the main shell 100 is provided with a pressure stabilizing valve 700 connected to the pipeline system 200, the pressure stabilizing valve 700 is capable of outputting the gas at a stable pressure, and the pressure stabilizing valve 700 has a first pressure stabilizing state applied to the high calorific value gas and a second pressure stabilizing state applied to the low calorific value gas.

It is understandable that, as shown in FIG. 1, by arranging the pressure stabilizing valve 700 applicable to different gas source environments, through which the gas enters the pipeline system 200, gas pressure in the pipeline system 200 can be stabilized, thus avoiding an excessively large gas pressure which may easily damage the pipeline system 200 and other internal valve bodies, and improving a reliability. Meanwhile, the pressure stabilizing valve 700 may also be switched between different use states according to a type of a gas source to be used, which is well applicable to the switching between the gas source environments with the high calorific value gas and the low calorific value gas. In actual application, a specific structural form of the pressure stabilizing valve 700 may be provided according to actual use needs, which will not be described in detail here, but will be described in detail below.

In some embodiments, the pressure stabilizing valve 700 includes a first shell 710, a second shell 720, a diaphragm 730, a pressure stabilizing rod 740, an elastic assembly 750 and a regulating assembly 760. The first shell 710 is provided with a gas inlet channel 711 and a gas outlet channel 711, the diaphragm 730 is connected between the first shell 710 and the second shell 720, the diaphragm 730 is hermetically connected to the first shell 710 to form a first cavity 713, and the diaphragm 730 is hermetically connected to the second shell 720 to form a second cavity 721. The gas inlet channel 711 and the gas outlet channel 712 are both communicated with the first cavity 713, the regulating assembly 760 is connected to the second shell 720, the elastic assembly 750 is connected to the regulating assembly 760 and acts on the diaphragm 730, and the pressure stabilizing rod 740 is connected to the diaphragm 730. The diaphragm 730 is deformable and extendable to drive the pressure stabilizing rod 740 to move relative to the first shell 710, the pressure stabilizing rod 740 is configured, cooperatively with a gas outlet of the gas inlet channel 711, to regulate a ventilation capacity, and the regulating assembly 760 is capable of regulating an elastic force of the elastic assembly 750 acted on the diaphragm 730, so as to switch the pressure stabilizing valve 700 between the first pressure stabilizing state and the second pressure stabilizing state.

Figure 3:
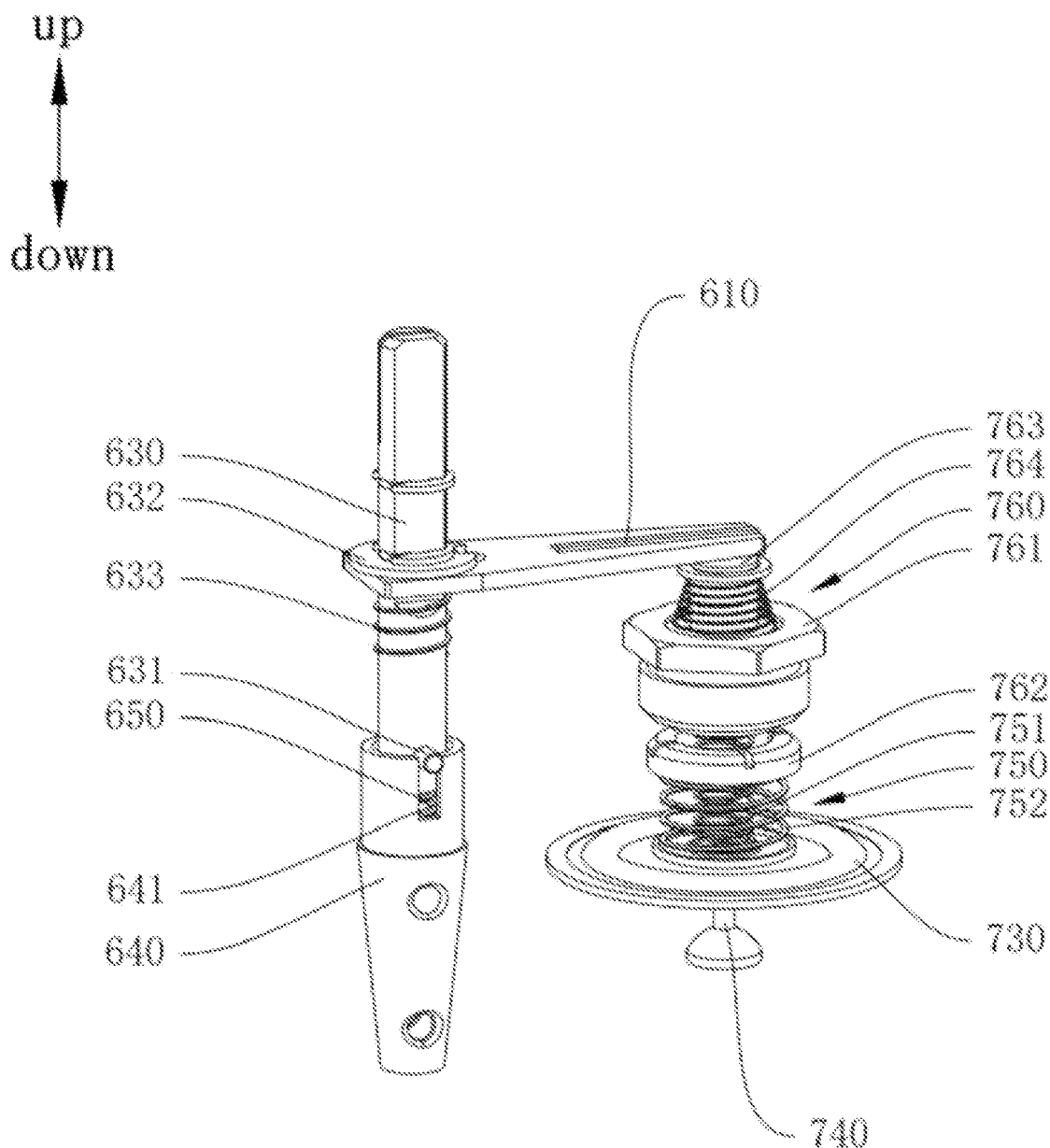
FIG. 3 is a partial structure diagram of the switching valve and the pressure stabilizing valve in FIG. 2.
Figure 4:
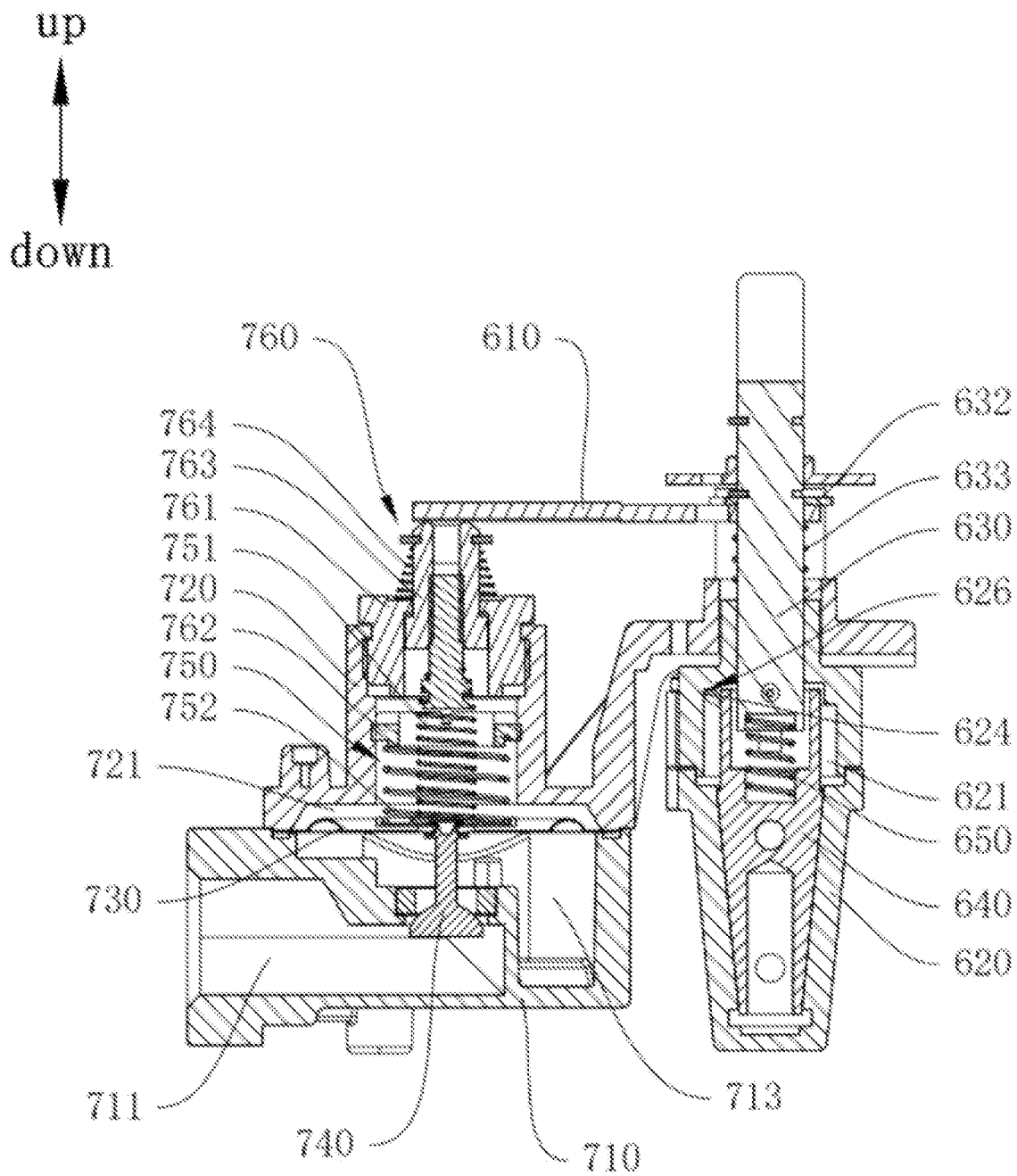
FIG. 4 is a first cross-sectional view of the switching valve and the pressure stabilizing valve in FIG. 2.
Figure 5:
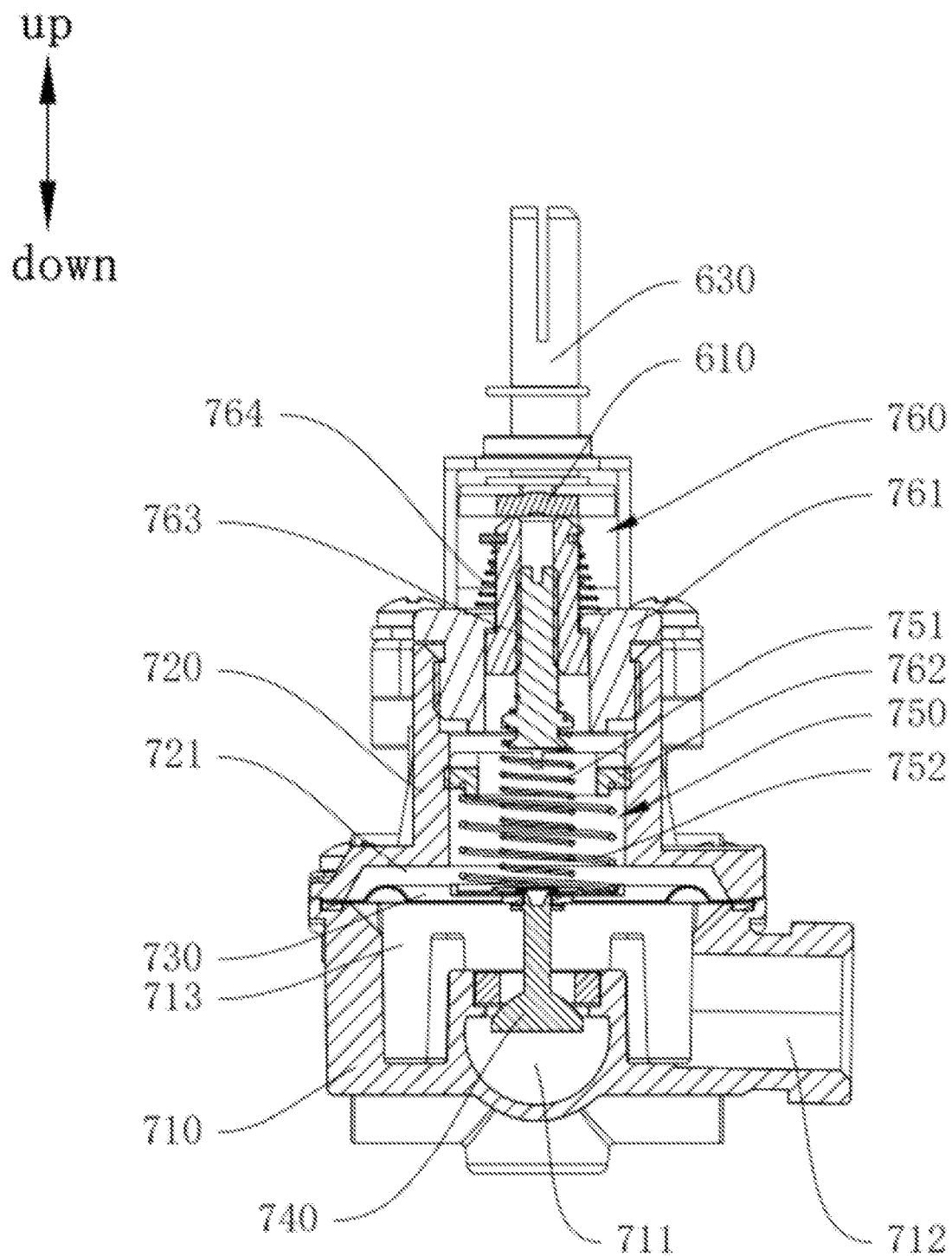
FIG. 5 is a second cross-sectional view of the switching valve and the pressure stabilizing valve in FIG. 2.
Figure 6:
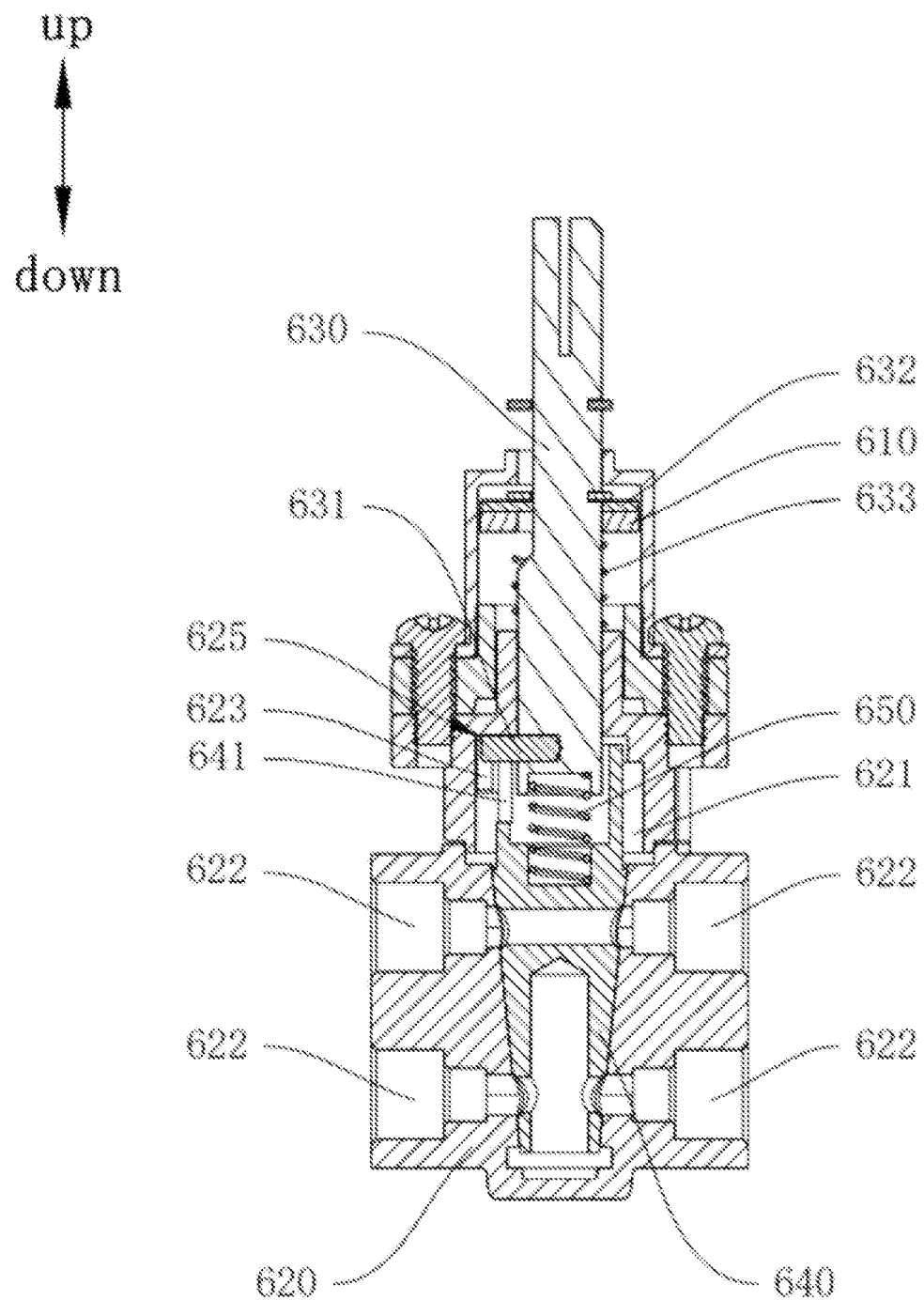
FIG. 6 is a third cross-sectional view of the switching valve and the pressure stabilizing valve in FIG. 2.
Figure 7:
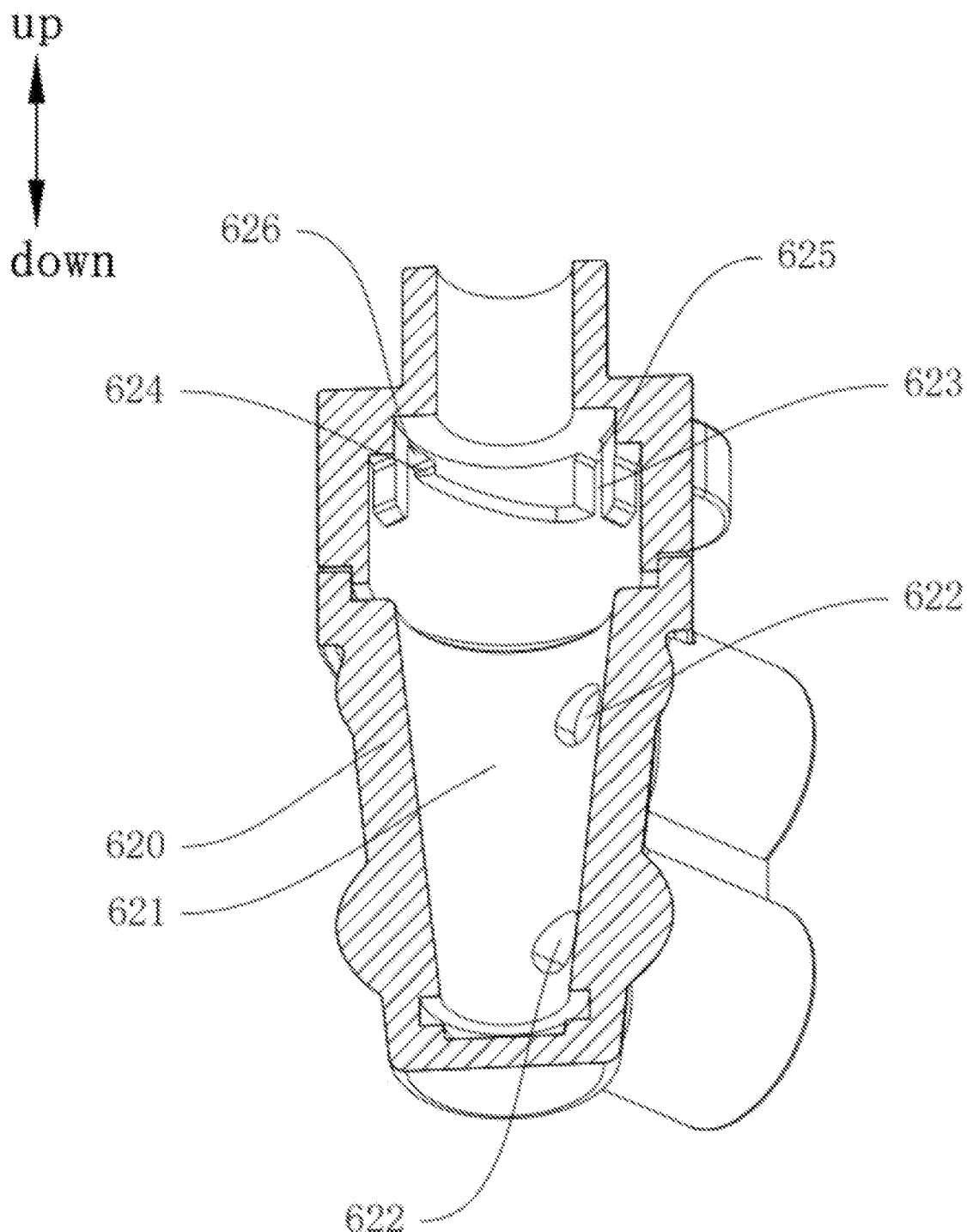
FIG. 7 is a cross-sectional structure diagram of a third shell in FIG. 2.

It is understandable that, as shown in FIG. 3, FIG. 4 and FIG. 5, when in use, the gas enters the first cavity 713 from the gas inlet channel 711, and the diaphragm 730 is deformed and extended according to an inlet pressure, so as to drive the pressure stabilizing rod 740 to move up and down relative to the first shell 710. A lower end of the pressure stabilizing rod 740 extends into the gas inlet channel 711, and is capable of shielding the gas outlet of the gas inlet channel 711. The pressure stabilizing rod 740 moves up and down to match with the gas outlet of the gas inlet channel 711, and an outlet area of the gas inlet channel 711 is changed to regulate the ventilation capacity, thus achieving the purpose of pressure stabilization. When switching the gas, the elastic force acted on the diaphragm 730 is regulated through the regulating assembly 760, so as to regulate and change an ability of deformation and extension of the diaphragm 730, so that the pressure stabilizing valve 700 is applicable to two types of gases (i.e., the high calorific value gas and the low calorific value gas) with different pressures, realizing the switching of the pressure stabilizing valve between the first pressure stabilizing state and the second pressure stabilizing state. Therefore, the present disclosure has a simple structure and is convenient to use.

In actual application, specific structures of the elastic assembly 750 and the regulating assembly 760 may both be provided according to actual use needs, which will not be described in detail here, but will be described in detail below. In addition to the above pressure stabilizing method, the pressure stabilizing valve 700 may also have a lever structure. The diaphragm 730 is deformed and extended to change the outlet area of the gas inlet channel 711 through the lever structure, so as to achieve the purpose of pressure stabilization. A specific structure of the pressure stabilizing valve 700 may be correspondingly changed according to actual use needs, which may be understood by those skilled in the art.

In some embodiment, the switching valve 600 includes a linkage member 610, and the linkage member 610 is connected to the regulating assembly 760. When the switching valve 600 switches the pipeline system 200 between the first communication state and the second communication state, the switching valve 600 is capable of being linked with the regulating assembly 760 through the linkage member 610.

Figure 2:
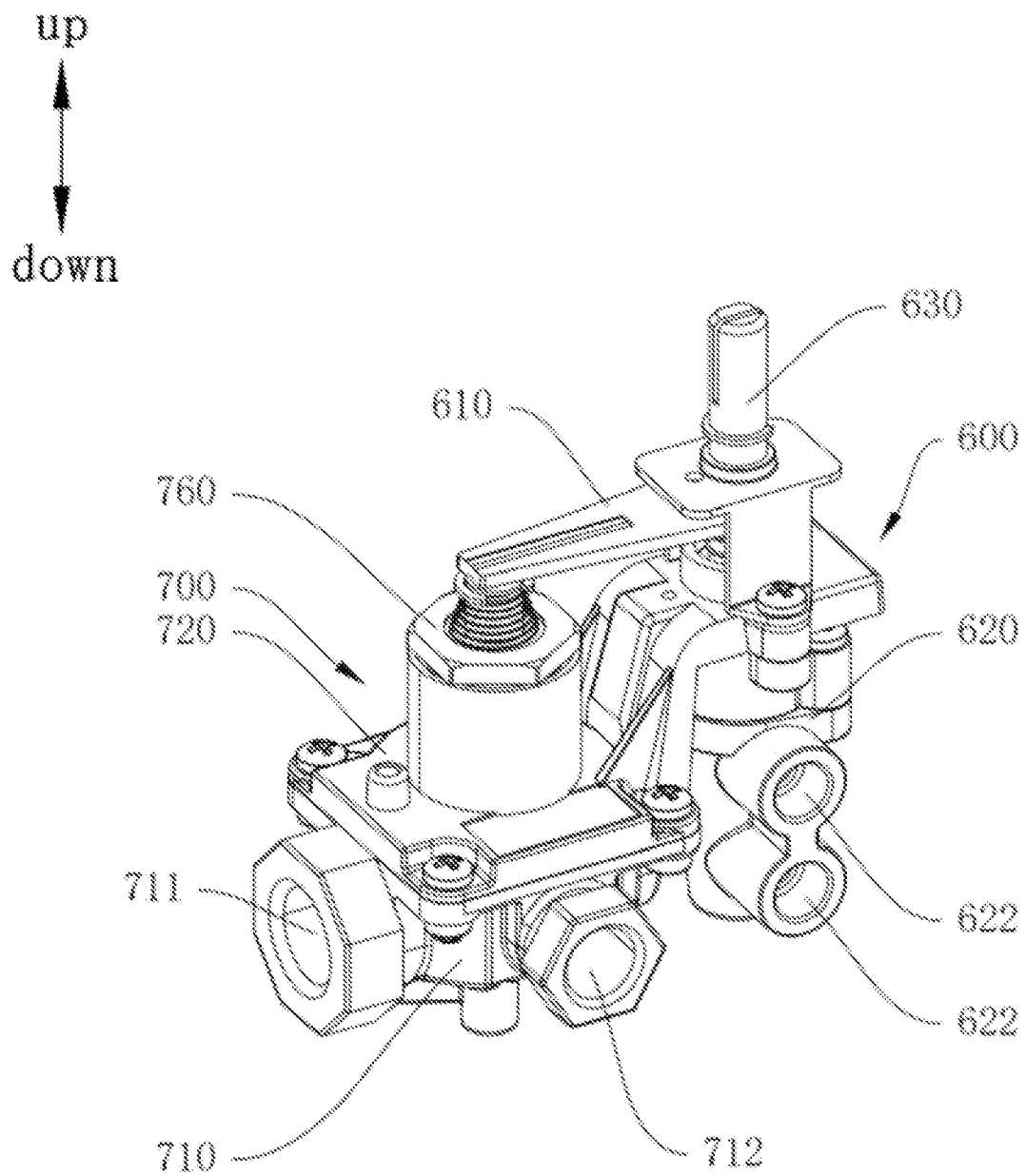
FIG. 2 is a structure diagram of a switching valve and a pressure stabilizing valve in FIG. 1.

It is understandable that, as shown in FIG. 2, FIG. 3 and FIG. 4, when switching the gas source used, a communication condition of the pipeline system 200 is regulated and changed through the switching valve 600 according to a type of the gas source to be switched, so that the pipeline system 200 is in a communication state applied to the gas source. Moreover, when performing switching and regulation, the switching valve 600 is capable of being linked with the regulating assembly 760 through the linkage member 610, so that the pressure stabilizing valve 700 can be switched between the first pressure stabilizing state and the second pressure stabilizing state, which is convenient to use and operate when switching the gas. Therefore, the present disclosure has a simple and reasonable structure, avoids switching and regulating the switching valve 600 and the pressure stabilizing valve 700 for multiple times, and is convenient to use. In actual application, a specific linkage method between the switching valve 600 and the pressure stabilizing valve 700 may be provided according to actual use needs, which will not be described in detail here, but will be described in detail below.

In some embodiments, the regulating assembly 760 includes a first connecting member 761, a second connecting member 762, a moving member 763 and a first elastic member 764. The first connecting member 761 and the second connecting member 762 are both connected to the second shell 720, the moving member 763 is slidably connected to the first connecting member 761, and two ends of the first elastic member 764 are respectively connected to the first connecting member 761 and the moving member 763. The moving member 763 is capable of abutting against the linkage member 610 under an action of the first elastic member 764. The elastic assembly 750 includes a second elastic member 751 and a third elastic member 752, one end of the second elastic member 751 is connected to the moving member 763, and the third elastic member 752 is connected to the second connecting member 762 and acts on the diaphragm 730. The switching valve 600 includes a third shell 620 and a plug valve rod 630, the plug valve rod 630 is movably inserted into the third shell 620, and the linkage member 610 is connected to the plug valve rod 630. The plug valve rod 630 is movable relative to the third shell 620 and is capable of driving the linkage member 610 to move relative to the third shell 620, and the linkage member 610 is capable of pushing the moving member 763 to move relative to the second shell 720, so that the other end of the second elastic member 751 acts on the diaphragm 730.

It is understandable that, as shown in FIG. 2, FIG. 3, FIG. 4 and FIG. 5, the plug valve rod 630 is further connected with a clamping sheet 632 and a fifth elastic member 633. The clamping sheet 632 is clamped and fixed on the plug valve rod 630, two ends of the fifth elastic member 633 are respectively connected to the third shell 620 and the linkage member 610, and the linkage member 610 is capable of abutting against the clamping sheet 632 under an action of the fifth elastic member 633. The first connecting member 761 and the second connecting member 762 are both threaded to the second shell 720. A lower end of the moving member 763 is provided with a connecting part for connecting to the second elastic member 751, and the connecting part is threaded to the moving member 763. Threaded connection of the first connecting member 761 facilitates mounting and replacement of the moving member 763, thus being convenient to use the moving member 763. Threaded connection of the second connecting member 762 enables an elastic force of the third elastic member 752 acted on the diaphragm 730 to be regulated according to up-down movement of the second connecting member 762 by spiral engagement, thus improving an applicability of the pressure stabilizing valve 700. Threaded connection between the connecting part and the moving member 763 can regulate an initial position of the second elastic member 751, so that a moving stroke thereof can be regulated, thus changing an elastic force thereof acted on the diaphragm 730, and further improving an applicability of the pressure stabilizing valve 700.

When the pressure stabilizing valve 700 needs to be switched to the second pressure stabilizing state, by pressing the plug valve rod 630 to move downwardly relative to the third shell 620 and by driving the linkage member 610 to move downwardly relative to the third shell 620 through the clamping sheet 632, the fifth elastic member 633 is compressed, and the linkage member 610 pushes the moving member 763 to move downwardly relative to the second shell 720, so that a lower end of the second elastic member 751 acts on the diaphragm 730. At the moment, the second elastic member 751 and the third elastic member 752 act on the diaphragm 730, the diaphragm 730 is difficult to be deformed and extended under an effect of the gas pressure, and the pressure stabilizing valve 700 is applicable to the high calorific value gas. When the pressure stabilizing valve 700 needs to be switched to the first pressure stabilizing state, the plug valve rod 630 moves upwardly relative to the third shell 620 to reset, and the linkage member 610 moves upwardly to reset and abut against the clamping sheet 632 under an action of the fifth elastic member 633. The moving member 763 abuts against the linkage member 610 under an action of the first elastic member 764, and moves along with the linkage member to reset, and drives the second elastic member 751 to move to reset, so that to be separated from the diaphragm 730 by its lower end. At the moment, the third elastic member 752 acts on the diaphragm 730, the diaphragm 730 is easy to be deformed and extended under an effect of the gas pressure, and the pressure stabilizing valve 700 is applicable to the low calorific value gas. The present disclosure has a simple and reasonable structure, is convenient to switch the pressure stabilizing valve 700 between the first pressure stabilizing state and the second pressure stabilizing state, is convenient to link the switching valve 600 with the pressure stabilizing valve 700 by the linkage member 610, and is convenient to use.

In actual application, the elastic assembly 750 may include one elastic member, and an elastic force thereof acted on the diaphragm 730 is changed by moving the moving member 763 up and down. Certainly, the elastic assembly 750 may also include three or more elastic members, which may be correspondingly provided according to actual use needs, and the regulating assembly 760 may be correspondingly changed according to a specific structure of the elastic assembly 750. Linkage connection between the linkage member 610 and the regulating assembly 760 may also be implemented through a wedge-shaped structure, a wedge-shaped block presses the moving member 763 to move downwardly along with rotation of the plug valve rod 630. The linkage member 610 may also be fixedly connected to the plug valve rod 630, so as to be driven to move by the plug valve rod 630. A specific structure of the linkage member 610 may be correspondingly changed according to actual use needs, which is not limited here.

In some embodiments, the switching valve 600 further includes a plug valve core 640, and the third shell 620 is provided with a valve core channel 621 and a plurality of connecting channels 622 communicated with the valve core channel 621. The connecting channels 622 are connected to the pipeline system 200, the plug valve core 640 is rotatably arranged in the valve core channel 621, and one end of the plug valve rod 630 extends into the valve core channel 621 and is provided with a clamping part 631 protruding along a radial direction. The plug valve core 640 is correspondingly provided with a clamping slot 641 for clamping the clamping part 631, the plug valve rod 630 is capable of driving the plug valve core 640 to rotate through cooperation of the clamping part 631 and the clamping slot 641, and the plug valve core 640 enables communication or separation of the valve core channel 621 and the connecting channel 622.

It is understandable that, as shown in FIG. 2, FIG. 3, FIG. 4 and FIG. 6, four connecting channels 622 are provided, and each of the connecting channels 622 is connected to a different pipeline in the pipeline system 200. When in use, the plug valve rod 630 moves downwardly to clamp the clamping part 631 into the clamping slot 641, so that the plug valve rod 630 is capable of driving the plug valve core 640 to rotate. The plug valve core 640 communicates the connecting channel 622 with the valve core channel 621 or separates the connecting channel 622 from the valve core channel 621, so as to change a communication condition between different connecting channels 622 through the valve core channel 621, so that the switching valve 600 is capable of regulating the communication condition between multiple connecting channels 622, so as to regulate and change the communication state of the pipeline system 200. Therefore, the present disclosure has a simple structure, is convenient to manufacture and process, and is stable and reliable in transmission connection. In actual application, in addition to arranging the clamping part 631, the plug valve rod 630 may also be connected to the plug valve core 640 through a sleeve connecting sheet or other connecting structures, such as a toggling structure, an abutting structure, and the like. A specific structure of the switching valve 600 may also be correspondingly changed according to actual use needs, which may be understood by those skilled in the art.

In some embodiments, the switching valve 600 further includes a fourth elastic member 650, and a first clamping slot for limiting 623 and a second clamping slot for limiting 624 are arranged in the valve core channel 621. The first clamping slot for limiting 623 is provided with a first slot bottom 625, the second clamping slot for limiting 624 is provided with a second slot bottom 626, and a spacing distance is arranged between the first slot bottom 625 and the second slot bottom 626 along an axial direction of the valve core channel 621. The fourth elastic member 650 is connected between the plug valve rod 630 and the plug valve core 640, the clamping part 631 is capable of being clamped into the first clamping slot for limiting 623 and abutting against the first slot bottom 625 under an action of the fourth elastic member 650, and the clamping part 631 is capable of being clamped into the second clamping slot for limiting 624 and abutting against the second slot bottom 626 under the action of the fourth elastic member 650.

It is understandable that, as shown in FIG. 3, FIG. 4, FIG. 6 and FIG. 7, the first clamping slot for limiting 623 and the second clamping slot for limiting 624 are both located at an upper end of the valve core channel 621, and the first slot bottom 625 is located above the second slot bottom 626, so that the spacing distance exists between the first slot bottom 625 and the second slot bottom 626 along the axial direction of the valve core channel 621. When the pressure stabilizing valve 700 is in the first pressure stabilizing state, the clamping part 631 of the plug valve rod 630 is correspondingly clamped in the first clamping slot for limiting 623 and abuts against the first slot bottom 625. When the pressure stabilizing valve is switched to the second pressure stabilizing state, the plug valve rod 630 moves downwardly and rotates, so that the clamping part 631 is separated from the first clamping slot for limiting 623 and rotates to a position of the second clamping slot for limiting 624. Then, the clamping part 631 is clamped into the second clamping slot for limiting 624 and abuts against the second slot bottom 626 under an action of the fourth elastic member 650. Since a height difference exists between the second slot bottom 626 and the first slot bottom 625 along the axial direction of the valve core channel 621, the plug valve rod 630 is capable of driving the linkage member 610 to keep pushing on the moving member 763, so that the pressure stabilizing valve 700 is capable of being kept in the second pressure stabilizing state. Moreover, when the pressure stabilizing valve is switched to the first pressure stabilizing state, similarly, the plug valve rod 630 moves downwardly and rotates, so that the clamping part 631 is separated from the second clamping slot for limiting 624 and rotates to a position of the first clamping slot for limiting 623. Then, the clamping part 631 is clamped into the first clamping slot for limiting 623 and abuts against the first slot bottom 625 under an action of the fourth elastic member 650. The linkage member 610 releases pushing on the moving member 763, and the pressure stabilizing valve 700 is capable of being kept in the first pressure stabilizing state. The present disclosure has a simple and reasonable structure, and keeps the pressure stabilizing valve 700 in the first pressure stabilizing state or the second pressure stabilizing state, and a reliability of the present disclosure is improved.

In actual application, in addition to arranging a structure of clamping slot for limiting to keep the state of the plug valve rod 630, so that the pressure stabilizing valve 700 is capable of being kept in two states, a magnetic attraction structure may also be arranged at a corresponding position of the valve core channel 621 to keep the plug valve rod 630, or a clamping structure capable of clamping and fixing the plug valve rod 630 may be arranged on the third shell 620, which may be correspondingly changed according to actual use needs, and is not limited here.

In some embodiments, the burner 400 includes a combustion shell 430 and an injection pipe 440 connected to the combustion shell 430. The combustion shell 430 is internally provided with a gas chamber 431, a combustion structure 432 for outputting gas in the gas chamber 431 is arranged on the combustion shell 430, and the injection pipe 440 includes a mixing channel 443, a first channel 441 and a second channel 442. An outlet end of the first channel 441 and an outlet end of the second channel 442 are communicated with each other and are both communicated with the mixing channel 443, an acute included angle is formed between the first channel 441 and the second channel 442, and the first nozzle 410 is correspondingly connected to an inlet of the first channel 441. An axis of the first nozzle 410 is collinear with an axis of the first channel 441, and the second nozzle 420 is correspondingly connected to an inlet of the second channel 442. An axis of the second nozzle 420 is collinear with an axis of the second channel 442, and the mixing channel 443 is communicated with the gas chamber 431. The ignition apparatus 500 is capable of igniting the output gas of the combustion structure 432.

Figure 8:
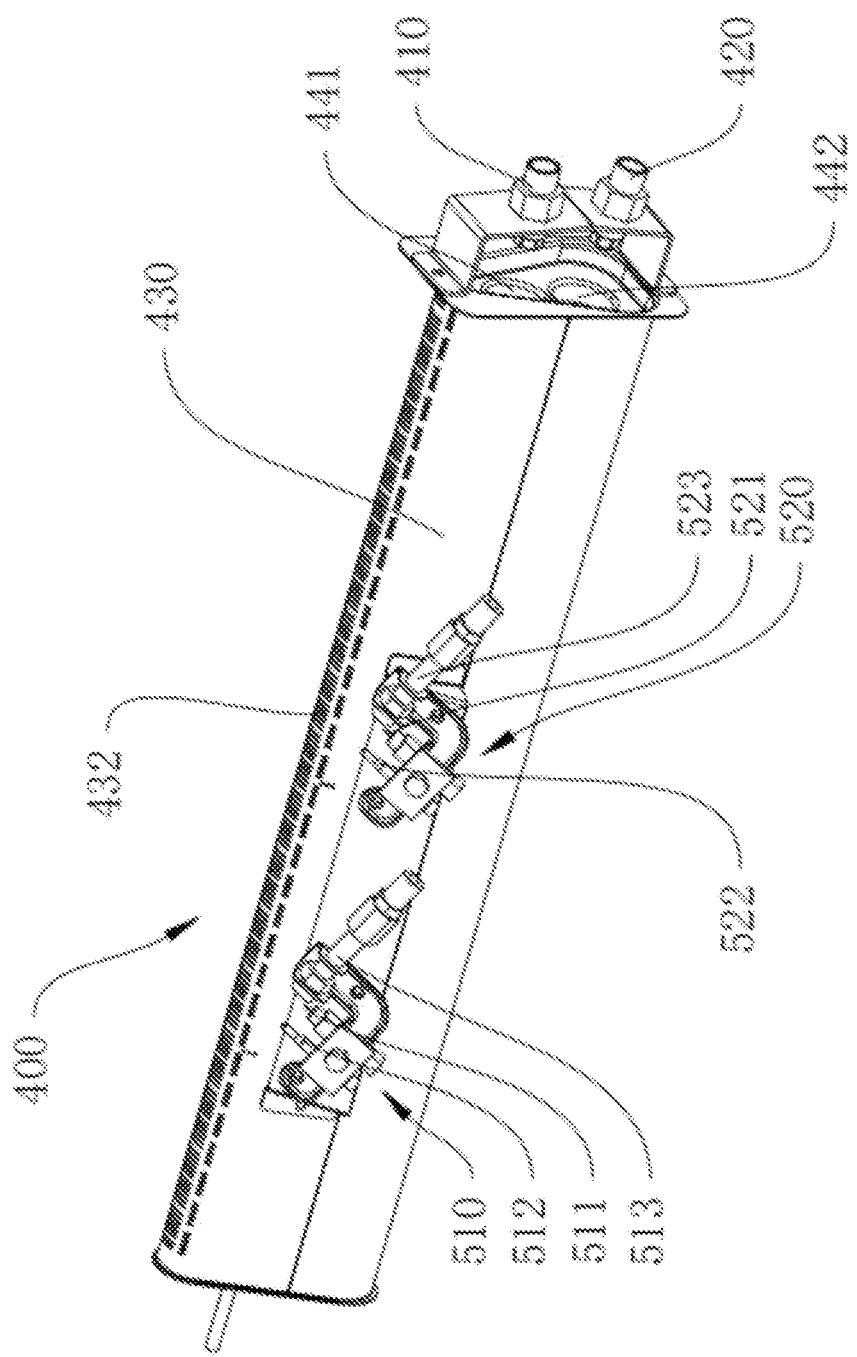
FIG. 8 is a partial structure diagram of a burner and an ignition apparatus in FIG. 1.
Figure 9:
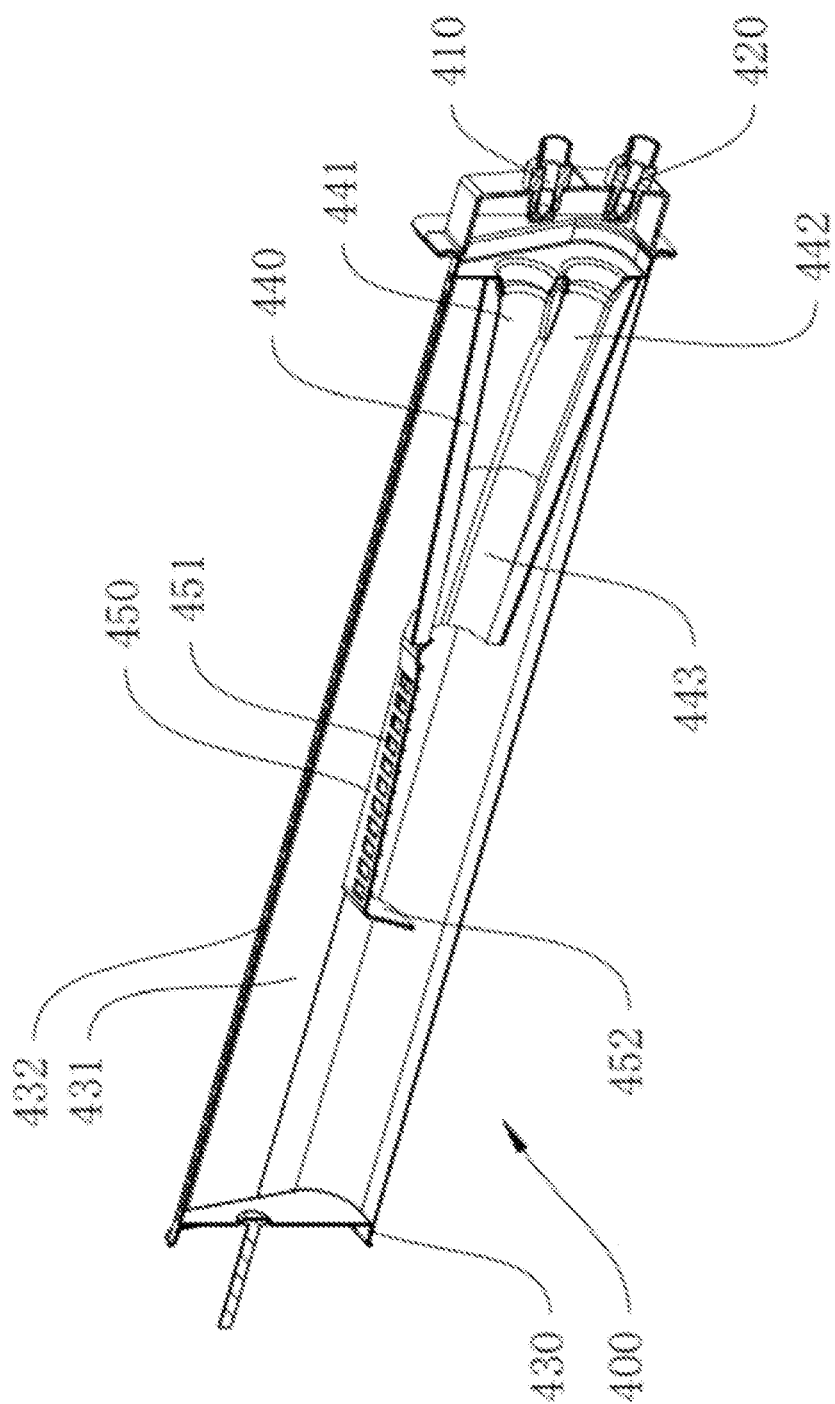
FIG. 9 is a cross-sectional structure diagram of the burner in FIG. 8.

It is understandable that, as shown in FIG. 1, FIG. 8 and FIG. 9, the combustion structure 432 is a fire hole arranged in the combustion shell 430, and inlet ends of the first channel 441 and the second channel 442 are both provided as a flared structure, so as to facilitate injection of surrounding air through the gas. When in use, the first nozzle 410 and the second nozzle 420 are both connected to the pipeline system 200, and the communication condition of the pipeline system 200 is switched through the switching valve 600. When one of the first nozzle 410 and the second nozzle 420 outputs the gas, the gas injects the surrounding air into a channel corresponding to the injection pipe 440, the gas and the air are mixed and output to the gas chamber 431 through the mixing channel 443, and then output through the gas structure and ignited by the ignition apparatus 500, so as to be combusted to supply heat. When the first nozzle 410 and the second nozzle 420 both output the gas, the two nozzles eject gas into corresponding channels respectively. Arrangement of the first channel 441 and the second channel 441 can reduce mutual interference between gas flows at an initial injection stage and add an air supply amount once. When the gas is ejected from a nozzle port at a high speed, the surrounding air is injected into the gas inlet channel 711, and the gas and the air begin to be mixed. When the gas enters the mixing channel 443 from the first channel 441 and the second channel 442, since the acute included angle exists between the two channels, two gas flows are ejected along an included angle direction and begin to approach a middle, and finally the gas and the air are mixed again in the mixing channel 443. Coaxial arrangement of the first nozzle 410 and the first channel 441 and coaxial arrangement of the second nozzle 420 and the second channel 442 facilitate the gas to enter the corresponding channel, and simultaneously facilitate the two gas flows to be collected and mixed along an included angle direction of the two channels, so that the gas and the air are well mixed, which is beneficial for improving a combustion performance of the burner 400, fully combusting the gas well, and improving a thermal efficiency. Therefore, the present disclosure has a simple and reasonable structure, is applicable to different gas ejection conditions, and has a good applicability.

In actual application, the combustion structure 432 may also be a porous ceramic plate, and the included angle between the first channel 441 and the second channel 442 may be provided according to actual use needs, such as 10 degrees, 15 degrees, and the like. The first nozzle 410 and the second nozzle 420 may both be correspondingly provided according to actual use needs. Since a composition of the nozzle described in the embodiments of the present disclosure is known to those of ordinary skills in the art, it will not be described in detail here.

In some embodiments, an outlet end of the mixing channel 443 is connected with a splitter plate 450, the splitter plate 450 is provided with a plurality of splitter holes 451, and a buffer baffle 452 is connected to the splitter plate 450. It is understandable that, as shown in FIG. 9, by connecting the outlet end of the mixing channel 443 with the splitter plate 450 which is providing with the plurality of splitter holes 451, after the gas is output from the mixing channel 443, the gas is capable of being uniformly dispersed and output to the gas chamber 431 from the splitter holes 451 through the splitter plate 450, so as to avoid excessively concentrated output of the gas which may lead to a small combustion area and non-fully combustion, thus improving a combustion effect of the present disclosure. Meanwhile, the buffer baffle plate 425 is capable of blocking the gas to slow down a flow rate of the gas, and is capable of avoiding excessively high combustion flame of the burner 400 caused by excessively rapid ejection of the gas flow, thus improving a use safety of the present disclosure. In actual application, specific structures of the splitter plate 450, the splitter holes 451 and the buffer baffle 452 may all be provided according to actual use needs, which will not be limited here.

In some embodiments, the ignition apparatus 500 includes a first ever-burning assembly 510, a second ever-burning assembly 520, an ignition control assembly 530 and a feedback control module. The first ever-burning assembly 510 includes a first ignition needle 511, a first thermocouple 512 and a third nozzle 513, and the second ever-burning assembly 520 includes a second ignition needle 521, a second thermocouple 522 and a fourth nozzle 523. The third nozzle 513 and the fourth nozzle 523 are both connected to the pipeline system 200, the third nozzle 513 is applicable to high calorific value gas, and the fourth nozzle 523 is applicable to low calorific value gas. The first ignition needle 511 and the second ignition needle 521 are both electrically connected to the ignition control assembly 530, the ignition control assembly 530 enables the first ignition needle 511 and the second ignition needle 521 generate an electric spark, and the feedback control module is electrically connected to the temperature-sensing valve 300, the first thermocouple 512 and the second thermocouple 522 respectively. The first thermocouple 512 and the second thermocouple 522 are both capable of feeding back a potential to the feedback control module according to heating conditions, and the feedback control module is capable of controlling the temperature-sensing valve 300 to be turned on and off according to feedback conditions of the first thermocouple 512 and the second thermocouple 522.

It is understandable that, as shown in FIG. 1 and FIG. 8, when in use, the third nozzle 513 and the fourth nozzle 523 output the gas according to the communication state of the pipeline system 200, and the ignition control assembly 530 makes the first ignition needle 511 and the second ignition needle 521 generate the electric spark, so as to ignite the gas output by the third nozzle 513 and the fourth nozzle 523. The combustion of the gas makes the first thermocouple 512 and the second thermocouple 522 induce the feedback electric potential to the feedback control module, and the feedback control module controls the temperature-sensing valve 300 to be turned on and off according to the feedback electric potential situation, thus implementing ignition operation of the ignition apparatus 500. Moreover, the ignition condition is capable of being fed back to the feedback control module through the thermocouple, so that the temperature-sensing valve 300 is capable of being controlled to be turned on and off through the feedback control module. When the gas to be used corresponds to the communication state of the pipeline system 200, a large potential difference exists between potentials fed back by the first thermocouple 512 and the second thermocouple 522, and the feedback control module controls the temperature-sensing valve 300 to be turned on normally. Moreover, when the gas to be used does not correspond to the communication state of the pipeline system 200, a small potential difference or no potential difference exists between the potentials fed back by the first thermocouple 512 and the second thermocouple 522. The feedback control module controls the temperature-sensing valve 300 to be turned off, and output of the gas is cut off, thus improving a use safety of the present disclosure.

Figure 10:
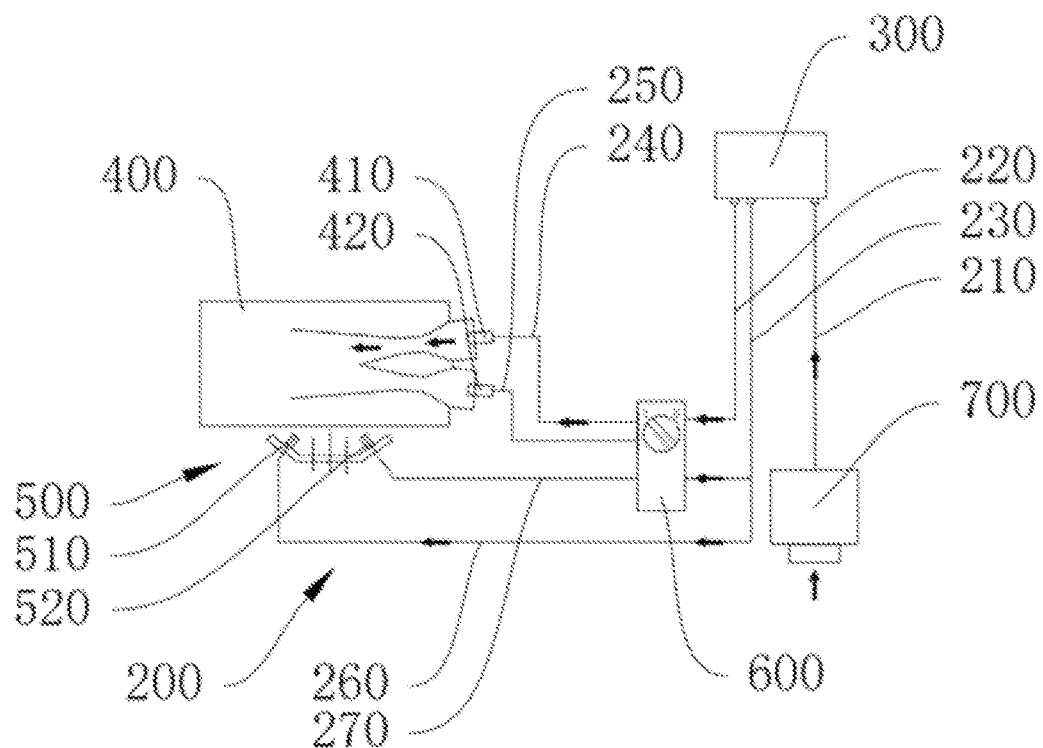
FIG. 10 is a structure diagram of a gas circuit of a pipeline system in a first communication state according to a first embodiment of the present disclosure.
Figure 11:
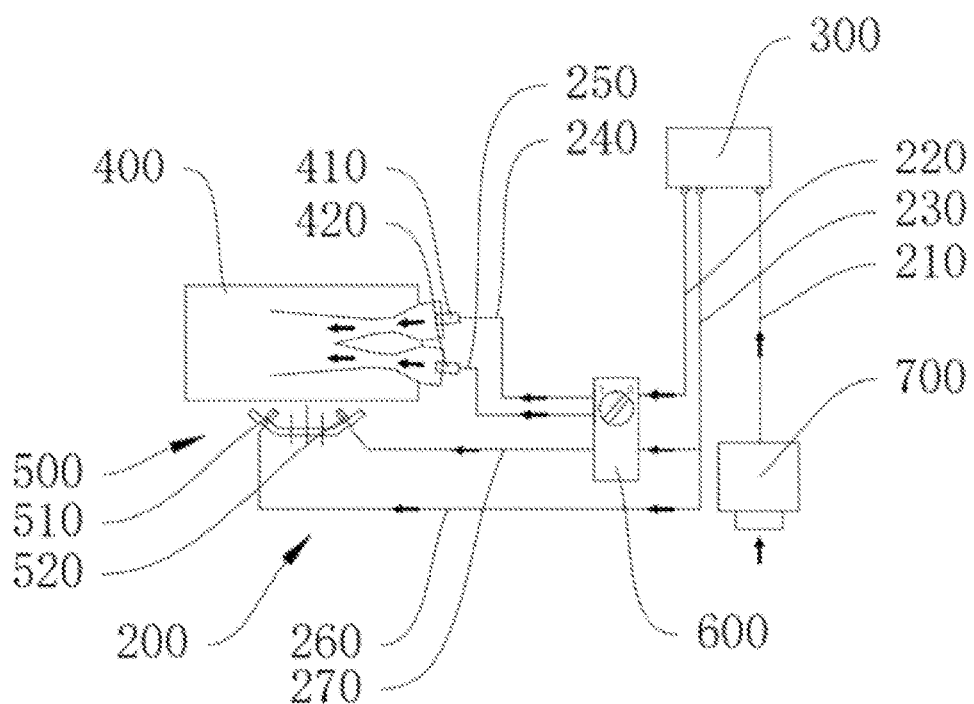
FIG. 11 is a structure diagram of the gas circuit of the pipeline system in a second communication state in FIG. 10.

It is understandable that, referring to FIG. 10 and FIG. 11 which show the first embodiment of the pipeline system 200, and the pipeline system 200 includes a first pipeline 210, a second pipeline 220, a third pipeline 230, a fourth pipeline 240, a fifth pipeline 250, a sixth pipeline 260 and a seventh pipeline 270. The first pipeline 210 is communicated with the pressure stabilizing valve 700 and the temperature-sensing valve 300, the second pipeline 220 is communicated with the temperature-sensing valve 300 and the switching valve 600, the third pipeline 230 is communicated with the temperature-sensing valve 300 and the switching valve 600, the fourth pipeline 240 is communicated with the switching valve 600 and the first nozzle 410, the fifth pipeline is communicated with the switching valve 600 and the second nozzle 420, the sixth pipeline is communicated with the third pipeline and the third nozzle 513, and the seventh pipeline is communicated with the switching valve 600 and the fourth nozzle 523. With reference to FIG. 10, the pipeline system 200 is in the first communication state, and the gas enters the pressure stabilizing valve 700 and is delivered to the temperature-sensing valve 300 through the first pipeline 210. The temperature-sensing valve 300 outputs the gas to the second pipeline 220 and the third pipeline 230, and the switching valve 600 disconnects communication with the fifth pipeline 250 and the seventh pipeline 270 respectively, and communicates the second pipeline 220 with the fourth pipeline 240. The gas from the second pipeline 220 is output to the fourth pipeline 240 through the switching valve 600, and is output from the first nozzle 410, and the gas from the third pipeline 230 is output from the third nozzle 513 through the sixth pipeline 260. The first thermocouple 512 feeds back a high potential, while the second thermocouple 522 has no potential feedback, thus forming a potential difference. The feedback control module controls the temperature-sensing valve 300 to be turned on normally. With reference to FIG. 11, the pipeline system 200 is in the second communication state, and the gas enters the pressure stabilizing valve 700 and is delivered to the temperature-sensing valve 300 through the first pipeline 210. The temperature-sensing valve 300 outputs the gas to the second pipeline 220 and the third pipeline 230, and the switching valve 600 communicates the second pipeline 220 with the fourth pipeline 240 and the fifth pipeline respectively, and communicates the third pipeline with the seventh pipeline. The gas from the second pipeline 220 is output to the fourth pipeline 240 and the fifth pipeline through the switching valve 600, and is output from the first nozzle 410 and the second nozzle 420. Since the first nozzle 410 is applied to the high calorific value gas, and is applied to high pressure gas, when the low calorific value gas is output from the first nozzle 410, less gas can be output. The gas from the third pipeline 230 is correspondingly output from the third nozzle 513 and the fourth nozzle 523 through the sixth pipeline 260 and the seventh pipeline 270 respectively. The second thermocouple 522 feeds back a high potential, and similarly, since less gas can be output when the low calorific value gas is output from the third nozzle 513, the first thermocouple 512 feeds back a low potential, thus forming a potential difference therebetween. The feedback control module controls the temperature-sensing valve 300 to be turned on normally.

Figure 12:
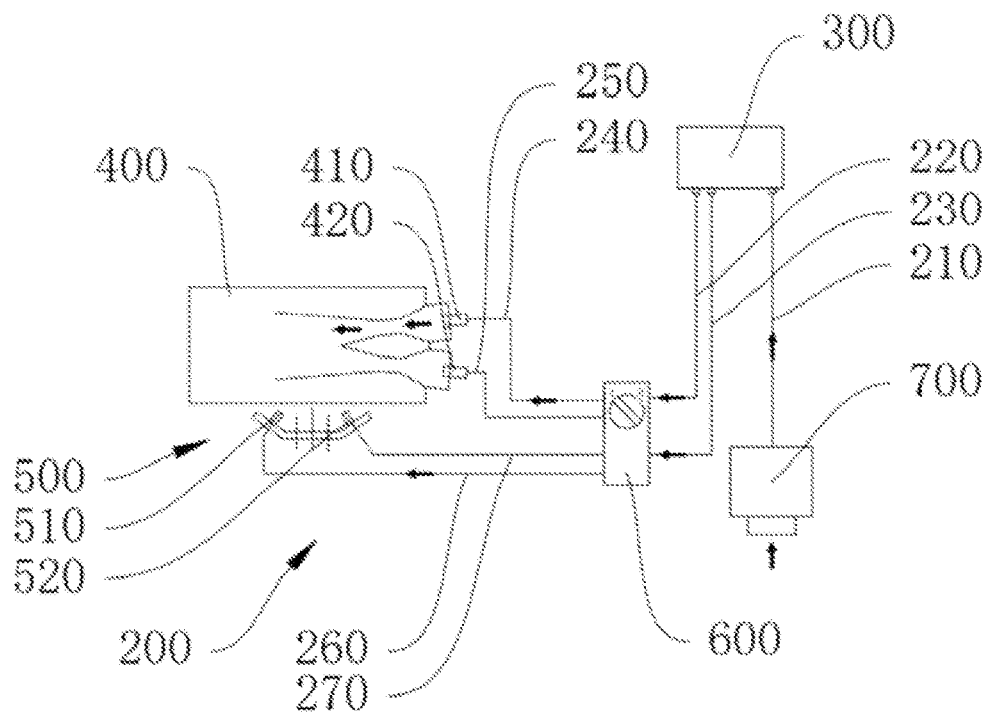
FIG. 12 is a structure diagram of a gas circuit of a pipeline system in a first communication state according to a second embodiment of the present disclosure.
Figure 13:
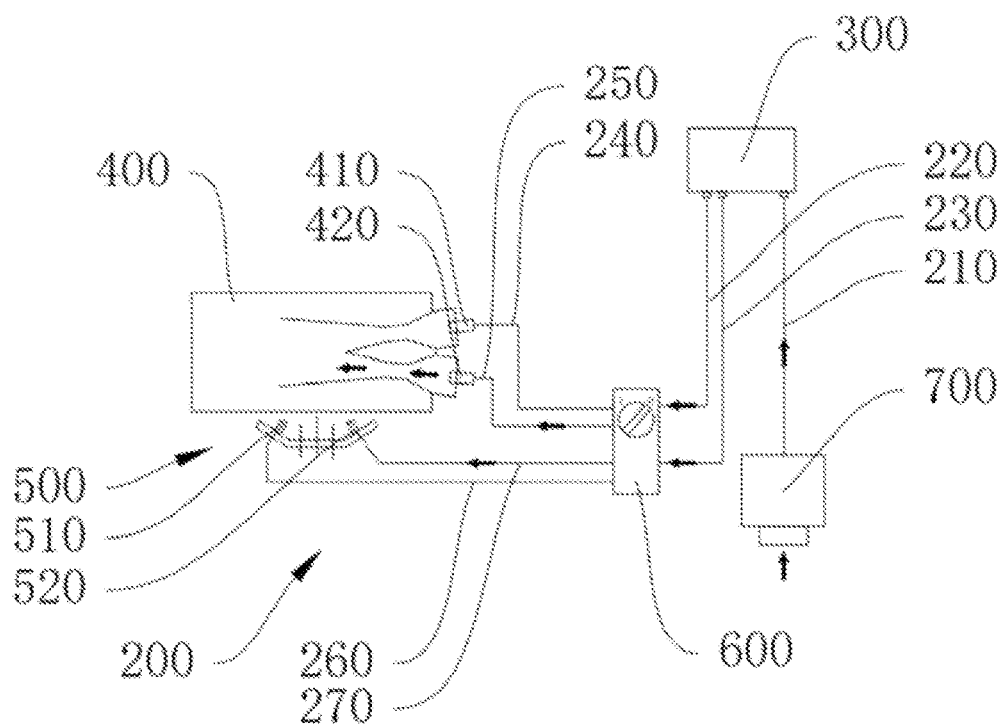
FIG. 13 is a structure diagram of the gas circuit of the pipeline system in a second communication state in FIG. 12.

Referring to FIG. 12 and FIG. 13 which shows the second embodiment of the pipeline system 200, and the pipeline system 200 includes a first pipeline 210, a second pipeline 220, a third pipeline 230, a fourth pipeline 240, a fifth pipeline 250, a sixth pipeline 260 and a seventh pipeline 270. The first pipeline 210 is communicated with the pressure stabilizing valve 700 and the temperature-sensing valve 300, the second pipeline 220 is communicated with the temperature-sensing valve 300 and the switching valve 600, the third pipeline 230 is communicated with the temperature-sensing valve 300 and the switching valve 600, the fourth pipeline 240 is communicated with the switching valve 600 and the first nozzle 410, the fifth pipeline is communicated with the switching valve 600 and the second nozzle 420, the sixth pipeline is communicated with the switching valve 600 and the third nozzle 513, and the seventh pipeline is communicated with the switching valve 600 and the fourth nozzle 523. With reference to FIG. 12, the pipeline system 200 is in the first communication state, and the gas enters the pressure stabilizing valve 700 and is delivered to the temperature-sensing valve 300 through the first pipeline 210. The temperature-sensing valve 300 outputs the gas to the second pipeline 220 and the third pipeline 230, and the switching valve 600 disconnects communication with the fifth pipeline 250 and the seventh pipeline 270 respectively, and communicates the second pipeline 220 with the fourth pipeline 240 and communicates the third pipeline with the sixth pipeline. The gas from the second pipeline 220 is output to the fourth pipeline 240 through the switching valve 600, and is output from the first nozzle 410, and the gas from the third pipeline 230 is output to the sixth pipeline 260 through the switching valve 600, and is output from the third nozzle 513. The first thermocouple 512 feeds back a high potential, while the second thermocouple 522 has no potential feedback, thus forming a potential difference. The feedback control module controls the temperature-sensing valve 300 to be turned on normally. With reference to FIG. 13, the pipeline system 200 is in the second communication state, and the gas enters the pressure stabilizing valve 700 and is delivered to the temperature-sensing valve 300 through the first pipeline 210. The temperature-sensing valve 300 outputs the gas to the second pipeline 220 and the third pipeline 230, and the switching valve 600 communicates the second pipeline 220 with the fifth pipeline, and communicates the third pipeline with the seventh pipeline. The gas from the second pipeline 220 is output to the fifth pipeline through the switching valve 600, and is output from the second nozzle 420, and the gas from the third pipeline 230 is output from the fourth nozzle 523 through the seventh pipeline 270. The second thermocouple 522 feeds back a high potential, while the first thermocouple 512 has no potential feedback, thus forming a potential difference. The feedback control module controls the temperature-sensing valve 300 to be turned on normally.

Figure 14:
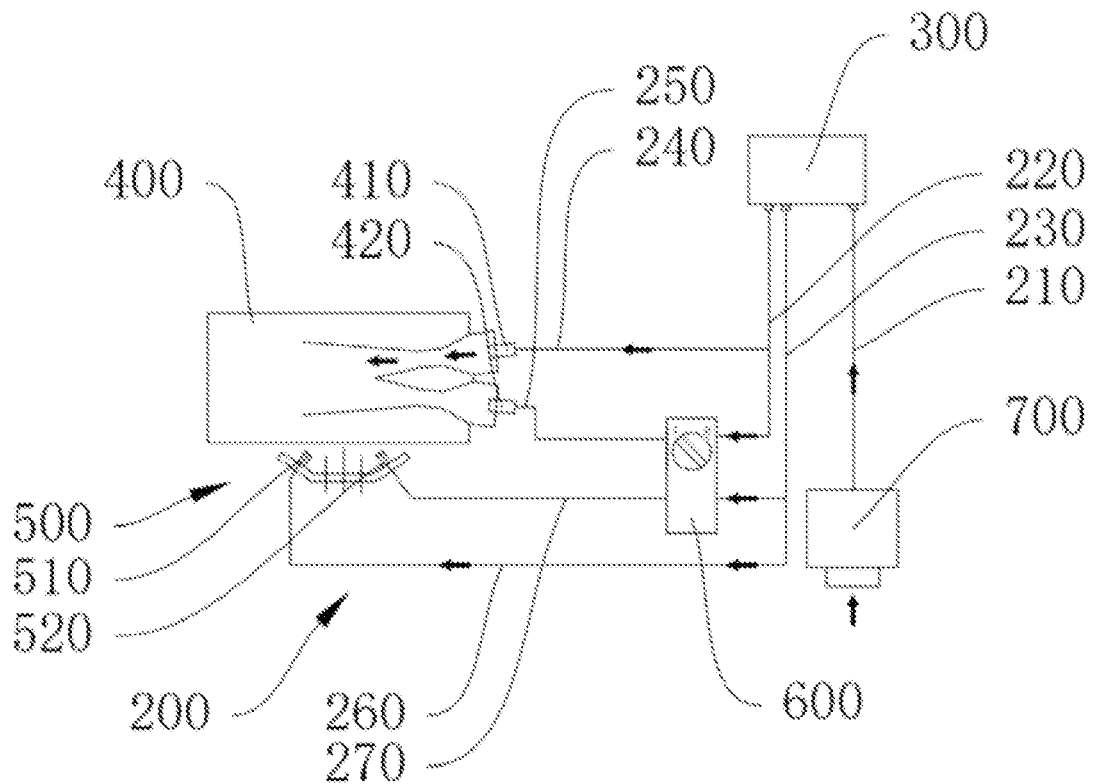
FIG. 14 is a structure diagram of a gas circuit of a pipeline system in a first communication state according to a third embodiment of the present disclosure.
Figure 15:
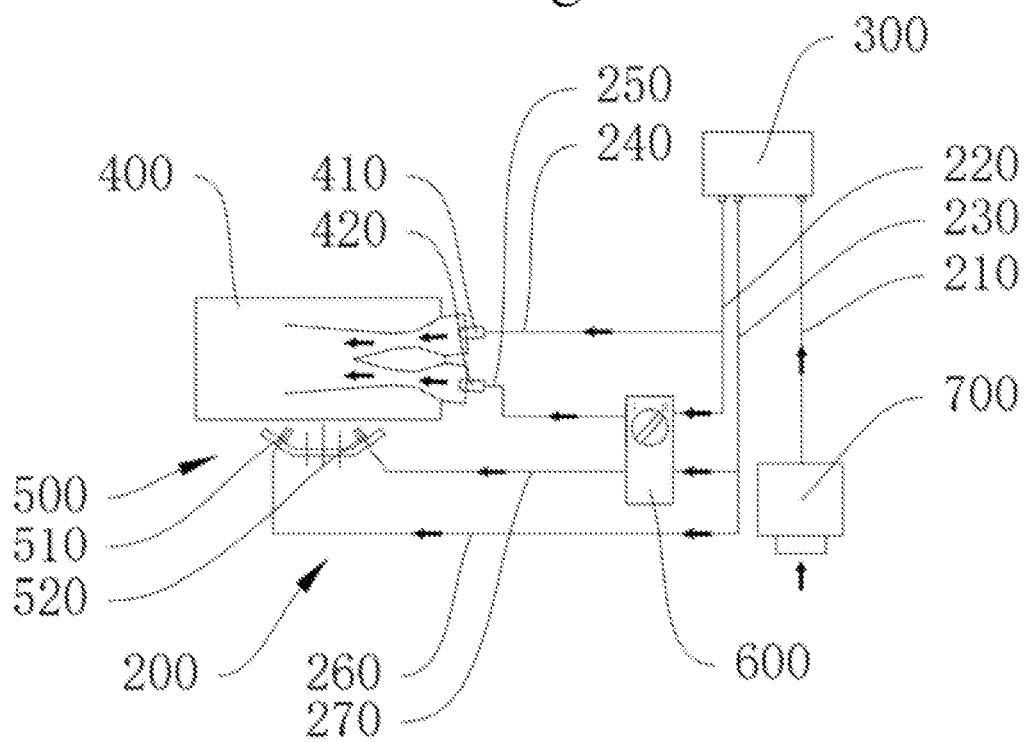
FIG. 15 is a structure diagram of the gas circuit of the pipeline system in a second communication state in FIG. 14.

Referring to FIG. 14 and FIG. 15 which show the third embodiment of the pipeline system 200, and the pipeline system 200 includes a first pipeline 210, a second pipeline 220, a third pipeline 230, a fourth pipeline 240, a fifth pipeline 250, a sixth pipeline 260 and a seventh pipeline 270. The first pipeline 210 is communicated with the pressure stabilizing valve 700 and the temperature-sensing valve 300, the second pipeline 220 is communicated with the temperature-sensing valve 300 and the switching valve 600, the third pipeline 230 is communicated with the temperature-sensing valve 300 and the switching valve 600, the fourth pipeline 240 is communicated with the second pipeline 442 and the first nozzle 410, the fifth pipeline is communicated with the switching valve 600 and the second nozzle 420, the sixth pipeline is communicated with the third pipeline and the third nozzle 513, and the seventh pipeline is communicated with the switching valve 600 and the fourth nozzle 523. With reference to FIG. 14, the pipeline system 200 is in the first communication state, and the gas enters the pressure stabilizing valve 700 and is delivered to the temperature-sensing valve 300 through the first pipeline 210. The temperature-sensing valve 300 outputs the gas to the second pipeline 220 and the third pipeline 230, and the switching valve 600 disconnects communication with the fifth pipeline 250 and the seventh pipeline 270 respectively. The gas from the second pipeline 220 is output from the first nozzle 410 through the fourth pipeline, and the gas from the third pipeline 230 is output from the third nozzle 513 through the sixth pipeline 260. The first thermocouple 512 feeds back a high potential, while the second thermocouple 522 has no potential feedback, thus forming a potential difference. The feedback control module controls the temperature-sensing valve 300 to be turned on normally. With reference to FIG. 15, the pipeline system 200 is in the second communication state, and the gas enters the pressure stabilizing valve 700 and is delivered to the temperature-sensing valve 300 through the first pipeline 210. The temperature-sensing valve 300 outputs the gas to the second pipeline 220 and the third pipeline 230, and the switching valve 600 communicates the second pipeline 220 with the fifth pipeline, and communicates the third pipeline with the seventh pipeline. The gas from the second pipeline 220 is output from corresponding first nozzle 410 and second nozzle 420 through the fourth pipeline 240 and the fifth pipeline respectively. The gas from the third pipeline 230 is correspondingly output from the third nozzle 513 and the fourth nozzle 523 through the sixth pipeline 260 and the seventh pipeline 270 respectively. The second thermocouple 522 feeds back a high potential, and similarly, since less gas can be output when the low calorific value gas is output from the third nozzle 513, the first thermocouple 512 feeds back a low potential, thus forming a potential difference therebetween. The feedback control module controls the temperature-sensing valve 300 to be turned on normally.

In actual application, specific structures of the ignition apparatus 500 and the pipeline system 200 may also be provided according to actual use needs, which may both be understood by those skilled in the art. Since other compositions and principles of the ignition needle, the thermocouple and the ignition control assembly 530 described in the embodiments of the present disclosure are all known to those of ordinary skills in the art, they will not be described in detail here.

The embodiments of the disclosure have been described in detail with reference to the drawings, but the disclosure is not limited to the above embodiments, and various changes can be made within the knowledge of those skilled in the art without departing from the principle of the disclosure.

What is claimed is:

1. A multi-gas-source heater, comprising:
   a main shell;
   a pipeline system arranged on said main shell and having a first communication state applied to high calorific value gas and a second communication state applied to low calorific value gas, wherein the high calorific value gas defines liquefied petroleum gas or propane, and the low calorific value gas defines natural gas or artificial gas;
   a temperature-sensing valve arranged on said main shell and connected to said pipeline system, said temperature-sensing valve being capable of regulating flow of an output gas;
   a burner arranged on said main shell, wherein said burner includes a first nozzle and a second nozzle, said first nozzle and said second nozzle being both connected to the pipeline system, said first nozzle being applicable to the high calorific value gas, and said second nozzle being applicable to the low calorific value gas;
   an ignition apparatus connected to said burner and capable of igniting said burner; and
   a switching valve arranged on said main shell and connected to said pipeline system, said switching valve being capable of switching said pipeline system between said first communication state and said second communication state;
   wherein when said switching valve switches said pipeline system to said first communication state, said first nozzle outputs the gas;
   wherein when said switching valve switches said pipeline system to said second communication state, said second nozzle output the gas, or said first nozzle and said second nozzle both output the gas;
   said main shell including a pressure stabilizing valve connected to said pipeline system, said pressure stabilizing valve being capable of outputting the gas at a stable pressure, said pressure stabilizing valve having a first pressure stabilizing state applied to the high calorific value gas and a second pressure stabilizing state applied to the low calorific value gas;
      said pressure stabilizing valve including a first shell, a second shell, a diaphragm, a pressure stabilizing rod, an elastic assembly, and a regulating assembly;
   said first shell having a gas inlet channel and a gas outlet channel;
   said diaphragm being connected between said first shell and said second shell;
   said diaphragm being hermetically connected to said first shell to form a first cavity;
   said diaphragm being hermetically connected to said second shell to form a second cavity;
   said gas inlet channel and the gas outlet channel being both in communication with said first cavity;
   said regulating assembly being connected to said second shell;
   said elastic assembly being connected to said regulating assembly and being configured to engage said diaphragm;
   said pressure stabilizing rod being connected to said diaphragm;
   said diaphragm being deformable and extendable to drive said pressure stabilizing rod to move relative to said first shell;
   said pressure stabilizing rod being configured, cooperatively with a gas outlet of said gas inlet channel, to regulate a ventilation capacity;
   said regulating assembly being configured to regulate an elastic force of said elastic assembly when engaging said diaphragm, so as to switch said pressure stabilizing valve between said first pressure stabilizing state and said second pressure stabilizing state;
   said switching valve including a linkage member;
   said the linkage member being connected to said regulating assembly, and when said switching valve switches said pipeline system between said first communication state and said second communication state, said switching valve is linked with said regulating assembly through said linkage member.

2. The multi-gas-source heater of claim 1, wherein
   said regulating assembly includes a first connecting member, a second connecting member, a moving member, and a first elastic member;
   said first connecting member and said second connecting member being both connected to said second shell;
   said moving member being slidably connected to said first connecting member, and two ends of said first elastic member being respectively connected to said first connecting member and said moving member;
   said moving member abutting against said linkage member under an action of said first elastic member;
   said elastic assembly includes a second elastic member and a third elastic member;

one end of said second elastic member being connected to said moving member;

said third elastic member being connected to said second connecting member and acts on said diaphragm; and said switching valve includes a third shell and a plug valve rod;

said plug valve rod being movably inserted into said third shell;

said linkage member being connected to said plug valve rod;

said plug valve rod being movable relative to said third shell and driving said linkage member to move relative to said third shell;

said linkage member pushing said moving member to move relative to said second shell, so that an other end of said second elastic member engages said diaphragm.

3. The multi-gas-source heater of claim 2, wherein said switching valve further includes a plug valve core;

said third shell having a valve core channel and a plurality of connecting channels communicated with said valve core channel;

said connecting channels being connected to said pipeline system;

said plug valve core being rotatably arranged in said valve core channel;

one end of said plug valve rod extending into said valve core channel and having a clamping part protruding along a radial direction;

said plug valve core having a clamping slot for clamping said clamping part;

said plug valve rod driving said plug valve core to rotate through cooperation of said clamping part and said clamping slot;

said plug valve core configured to enable communication or separation of said valve core channel and said connecting channel.

4. The multi-gas-source heater of claim 3, wherein said switching valve further includes a fourth elastic member, a first clamping slot for limiting, and a second clamping slot for limiting are arranged in said valve core channel;

said first clamping slot for limiting having a first slot bottom;

said second clamping slot for limiting having a second slot bottom;

a spacing distance being arranged between said first slot bottom and said second slot bottom along an axial direction of said valve core channel;

said fourth elastic member being connected between said plug valve rod and said plug valve core;

said clamping part being configured to clamp into said first clamping slot for limiting and abutting against said first slot bottom under an action of said fourth elastic member;

said clamping part being configured to clamp into said second clamping slot for limiting and abutting against said second slot bottom under the action of said fourth elastic member.

5. The multi-gas-source heater of claim 1, wherein said burner includes a combustion shell and an injection pipe connected to said combustion shell;

said combustion shell having internally a gas chamber;

a combustion structure for outputting gas in said gas chamber being arranged on said combustion shell;

said injection pipe includes a mixing channel, a first channel, and a second channel;

an outlet end of said first channel and an outlet end of said second channel being communicated with each other and being both communicated with said mixing channel;

an acute included angle being formed between said first channel and said second channel;

said first nozzle being connected to an inlet of said first channel;

an axis of said first nozzle being collinear with an axis of said first channel;

said second nozzle being connected to an inlet of said second channel;

an axis of said second nozzle being collinear with an axis of said second channel;

said mixing channel being communicated with said gas chamber;

said ignition apparatus being capable of igniting the output gas of said combustion structure.

6. The multi-gas-source heater of claim 5, wherein an outlet end of said mixing channel is connected with a splitter plate, said splitter plate having a plurality of splitter holes, a buffer baffle being connected to the splitter plate.

7. The multi-gas-source heater of claim 1, wherein said ignition apparatus includes a first burning assembly, a second burning assembly, an ignition control assembly, and a feedback control module;

the said first burning assembly includes a first ignition needle, a first thermocouple, and a third nozzle;

said second burning assembly includes a second ignition needle, a second thermocouple and a fourth nozzle;

said third nozzle and said fourth nozzle being both connected to said pipeline system;

said third nozzle being applicable to high calorific value gas;

said fourth nozzle being applicable to low calorific value gas;

said first ignition needle and said second ignition needle being both electrically connected to said ignition control assembly;

said ignition control assembly being configured to enable the said first ignition needle and said second ignition needle to generate an electric spark;

said feedback control module being electrically connected to said temperature-sensing valve, said first thermocouple, and said second thermocouple, respectively;

said first thermocouple and said second thermocouple being both capable of feeding back a potential to said feedback control module according to heating conditions;

said feedback control module controlling said temperature-sensing valve to be turned on and off according to feedback conditions of said first thermocouple and said second thermocouple.

* * * * *